United States Patent
Bowden

(10) Patent No.: US 11,713,792 B2
(45) Date of Patent: Aug. 1, 2023

(54) FRICTION DEVICE WITH BONDING INSERTS

(71) Applicant: RFPC HOLDING CORP., Wilmerding, PA (US)

(72) Inventor: Alan Gary Bowden, Laurinburg, NC (US)

(73) Assignee: RFPC HOLDING CORP., Wilmerding, PA (US)

( * ) Notice: Subject to any disclaimer, the term of this patent is extended or adjusted under 35 U.S.C. 154(b) by 0 days.

(21) Appl. No.: 17/514,074

(22) Filed: Oct. 29, 2021

(65) Prior Publication Data

US 2022/0049749 A1 Feb. 17, 2022

Related U.S. Application Data

(63) Continuation-in-part of application No. PCT/US2020/037144, filed on Jun. 11, 2020.

(60) Provisional application No. 62/859,951, filed on Jun. 11, 2019, provisional application No. 62/860,065, filed on Jun. 11, 2019.

(51) Int. Cl.
  *F16D 65/00* (2006.01)
  *F16D 65/06* (2006.01)

(52) U.S. Cl.
  CPC ......... *F16D 65/0037* (2013.01); *F16D 65/06* (2013.01)

(58) Field of Classification Search
  CPC .... F16D 65/06; F16D 65/0037; F16D 65/062; F16D 65/065; F16D 65/067; F16D 69/04; F16D 69/0408; F16D 69/0416
  See application file for complete search history.

(56) References Cited

U.S. PATENT DOCUMENTS 5,732,800 A 3/1998 Spigener
5,788,027 A * 8/1998 Shute ................ F16D 65/0037
  188/251 M (Continued)

FOREIGN PATENT DOCUMENTS

AU  6477898 A1  11/1999
CN  1295954 U  5/2001

(Continued)

OTHER PUBLICATIONS

Office Action dated Jun. 30, 2022 for corresponding Eurasian Patent application No. 202191866.

(Continued)

*Primary Examiner* — Vishal R Sahni
(74) *Attorney, Agent, or Firm* — The Small Patent Law Group LLC; Christopher R. Carroll

(57) ABSTRACT

A conditioning insert of a friction device includes a body having a conditioning surface configured to engage a wheel, opposite first and second sides intersecting the conditioning surface, and opposite third and fourth sides intersecting the conditioning surface. Each of the first and second sides extend from the third side to the fourth side. The body includes one or more of (a) a recess extending into one or more of the first side, the second side, the third side, or the fourth side and is configured to receive friction material of the friction device and/or (b) a protrusion extending out of the first side, the second side, the third side, or the fourth side and into the friction material of the friction device.

20 Claims, 19 Drawing Sheets

(56) References Cited

U.S. PATENT DOCUMENTS

| | | | | |
|---|---|---|---|---|
| 6,241,058 B1* | 6/2001 | Shute | ............... | F16D 65/062 |
| | | | | 188/251 M |
| 8,365,884 B2* | 2/2013 | Kahr | ............... | F16D 65/062 |
| | | | | 188/250 F |
| 8,763,769 B2* | 7/2014 | Rumph | ............ | F16D 65/0037 |
| | | | | 188/248 |
| 2003/0234142 A1* | 12/2003 | Shute | ............... | F16D 65/062 |
| | | | | 188/250 B |
| 2003/0234143 A1* | 12/2003 | Shute | ............... | B61H 1/00 |
| | | | | 188/250 R |
| 2011/0132705 A1 | 6/2011 | Rumph et al. | | |

FOREIGN PATENT DOCUMENTS

| | | |
|---|---|---|
| CN | 201818681 U | 5/2011 |
| CN | 202040250 U | 11/2011 |
| CN | 204512260 U | 7/2015 |
| CN | 206409545 U | 8/2017 |
| DE | 202007012902 U | 12/2007 |
| EP | 0775842 A1 | 5/1997 |
| JP | H1030661 A | 2/1998 |
| JP | H11141583 A | 5/1999 |
| JP | 2000230589 A | 8/2000 |
| JP | 2008002549 A | 1/2008 |
| RU | 79628 U1 | 1/2009 |

OTHER PUBLICATIONS

International Preliminary Report on Patentability dated Dec. 23, 2021 for corresponding International application No. PCT/US2020/037144 (13 pages).

International Search Report and Written Opinion dated Sep. 25, 2020 for corresponding International application No. PCT/US2020/037144 (13 pages).

Office Action dated Feb. 22, 2023 for corresponding Chinese Patent Application No. 202080038308.9 English translation provided. (26 pages).

* cited by examiner

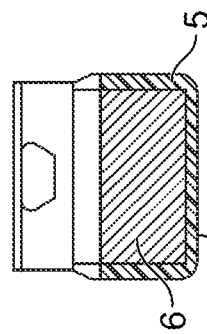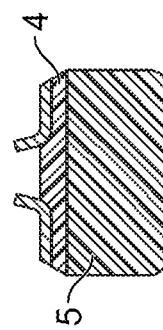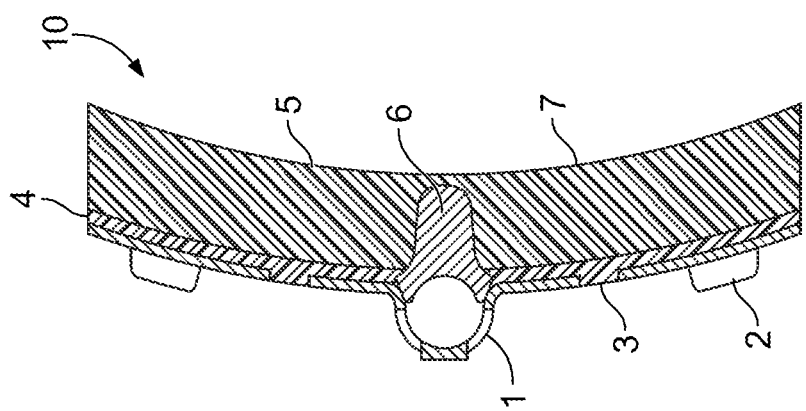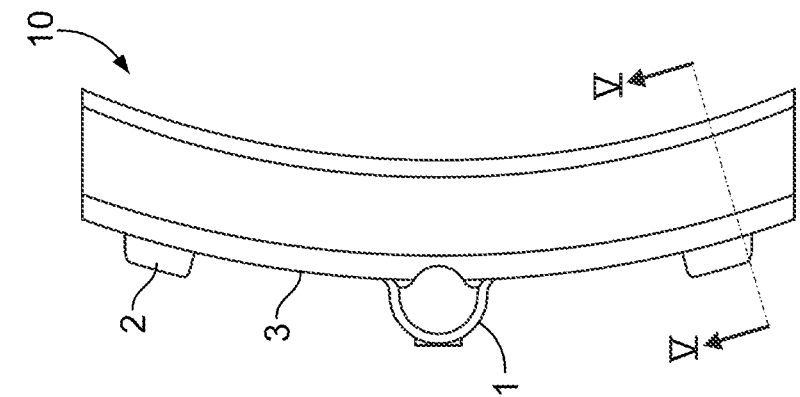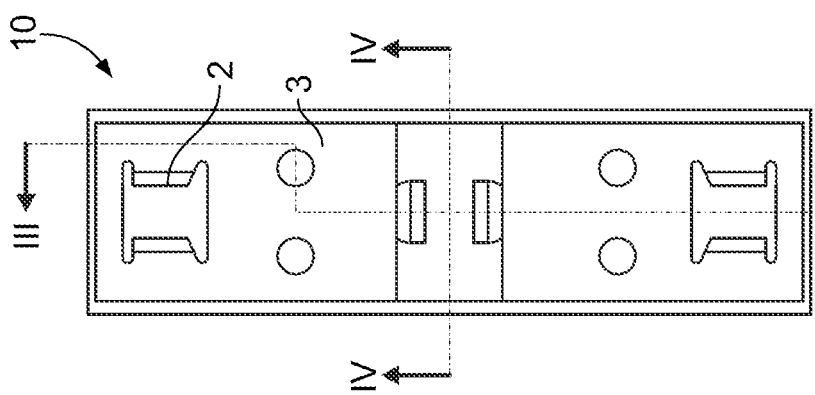

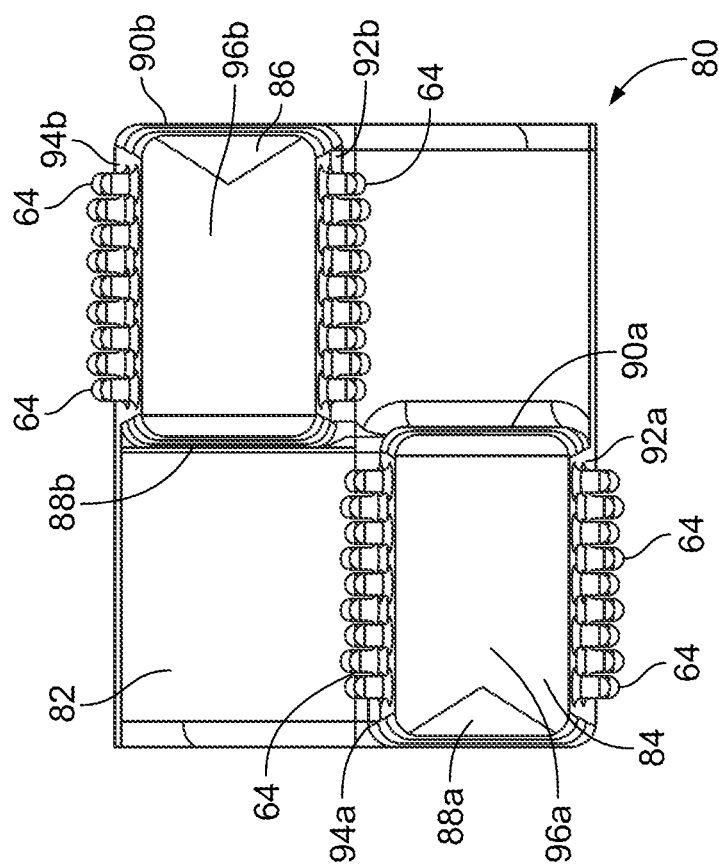
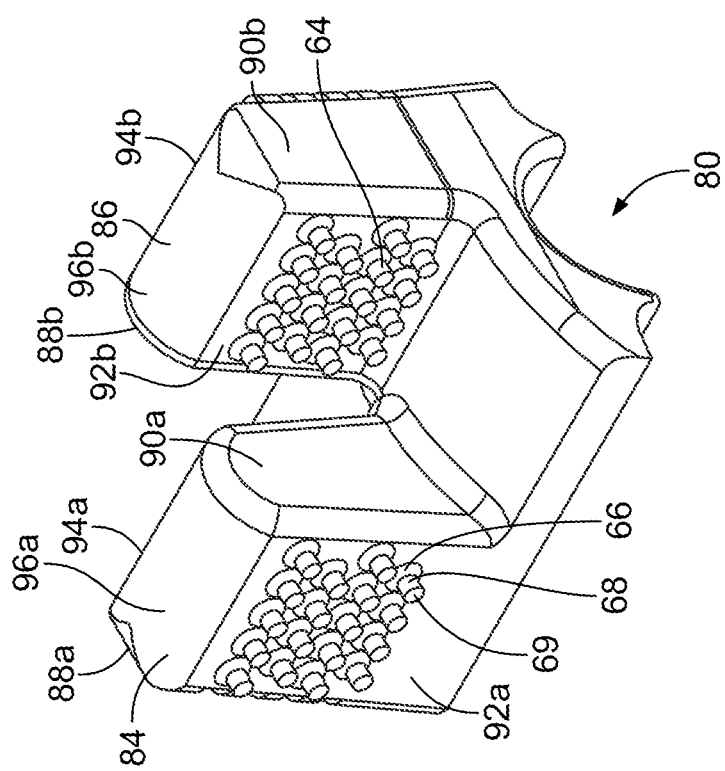
FIG. 24B
FIG. 24A

FRICTION DEVICE WITH BONDING INSERTS

CROSS-REFERENCE TO RELATED APPLICATIONS

This application is a bypass continuation-in-part of and claims priority to International Patent Application No. PCT/US2020/37144 (filed 11 Jun. 2020), which claims priority to U.S. Provisional Application Nos. 62/859,951 and 62/860,065 (both of which were filed 11 Jun. 2019). The entire disclosures of these applications are incorporated by reference herein.

BACKGROUND

Technical Field

The subject matter described herein relates to a friction device having a wheel conditioning insert with improved bonding features and/or a bonded, tread conditioning insert.

Description of Art

Various types of friction devices (e.g., brake shoes) having different compositions are used to achieve specific braking requirements. For example, these compositions may include cast iron and other types of friction materials that are specifically formulated for a number of predetermined applications. These various types of friction material will exhibit a number of uniquely different friction characteristics upon a wheel of a railway vehicle, specifically the wheel tread.

These various types of friction material will normally exhibit a number of uniquely different friction characteristics. Such friction characteristics, for example, include both high friction material and low friction material which are usually selected on the basis of braking performance requirements. Secondary beneficial functions, such as reconditioning a wheel surface that may have surface defects, may be considered when selecting a friction material. These benefits may be realized with the addition of a friction material insert within the friction device.

Some friction devices have a friction material insert disposed therein. For example, U.S. Pat. No. 6,241,058 to Schute describes such a friction device. FIGS. 1 through 5 show a friction device 10 having a wheel conditioning insert 6 disposed therein. The friction device includes a backing plate 3 that may be made of metallic material such as steel, but other reinforced composite materials suitable for use with railway vehicles may be used. The backing plate includes a key bridge 1. The key bridge may be integrally formed to the backing plate or the key bridge may be attached prior to installation of the friction device. The backing plate includes a pair of rejection lugs 2 that may be integrally formed with the backing plate and extend from a top surface thereof. The rejection lugs are sized and positioned in such a way so as to mate with corresponding rejection lug receptacles (not shown) on a corresponding brake head (not shown). The rejection lugs may be configured to be compatible with a variety of brake heads or the lugs may be configured so as to only correspond with a certain type of brake head to prevent the installation of the friction device on an improper brake head.

As shown in FIGS. 3 and 4 of Schute, a composition friction material 5 extends from the backing plate to provide the required friction and braking effort when forced against the tread of a railway vehicle wheel. The composition friction material has a generally arcuate brake surface 7 to conform to the shape of the wheel of the railway vehicle (not shown). Embedded in the composition friction material is a wheel conditioning insert. The wheel conditioning insert is fully encapsulated by the composition friction material, but after repeated uses of the friction device, the composition friction material will wear away and expose the wheel conditioning insert to the railway vehicle wheel. As the friction device is applied to a railway vehicle wheel, the brake surface of the composition friction material will apply a braking force to the wheel. The wheel conditioning insert will apply a braking force to the wheel, but the insert serves to condition the wheel, removing defects such as shells or spalls.

The addition of a wheel conditioning insert may lessen the stability of the composition friction material surrounding the insert. Specifically, the use of a wheel conditioning insert may lead to cracking, degradation, or loosening of the friction device material around the wheel conditioning insert. Better bonding or attachment between the friction material insert and the friction device material would be desirable to prevent cracking or degradation of the friction device material.

Additionally, because braking performance is a prime function of friction devices, use of lower-type friction material may be adequate for braking purposes. However, lower-type friction material provides no consideration for the secondary beneficial function of reconditioning a wheel tread surface. A wheel tread surface may have certain surface defects such as shells or spalls. Removal of these defects will normally extend the useful life of a wheel that is in service.

A friction device surface could be used which would be aggressive as far as reconditioning the wheel surface. However, this design may not provide appropriate friction levels for braking and may have a disadvantage of creating significant sparking during brake applications which could result in a hazardous condition. There is another friction device design which is a shoe material made entirely from an aggressive grinding type material; however, this shoe must be applied and then immediately removed after a very low speed brake application.

It may be desirable to have a system and method that differs from those that are currently available.

BRIEF SUMMARY

In view of the above, there is a need for a friction material insert for a friction device (such as a brake shoe) that increases the mechanical bonding properties, including improved shear or pull-off strength, between the friction material insert and the friction material of the friction device.

In one embodiment, a conditioning insert of a friction device includes a body having a conditioning surface configured to engage a wheel, opposite first and second sides intersecting the conditioning surface, and opposite third and fourth sides intersecting the conditioning surface. Each of the first and second sides extend from the third side to the fourth side. The body includes one or more of (a) a recess extending into one or more of the first side, the second side, the third side, or the fourth side and is configured to receive friction material of the friction device and/or (b) a protrusion extending out of the first side, the second side, the third side, or the fourth side and into the friction material of the friction device.

A friction device for a wheel includes friction material configured to engage a surface of the wheel to slow or stop movement of the wheel and a conditioning insert embedded in the friction material. The conditioning insert includes a body having a conditioning surface configured to engage the surface of the wheel, opposite first and second sides intersecting the conditioning surface, and opposite third and fourth sides intersecting the conditioning surface. Each of the first and second sides extends from the third side to the fourth side. The body includes one or more of (a) a recess extending into one or more of the first side, the second side, the third side, or the fourth side and is configured to receive friction material of the friction device and/or (b) a protrusion extending out of the first side, the second side, the third side, or the fourth side and into the friction material of the friction device.

A friction device for use on a vehicle includes a backing plate adapted to interface with a brake head of the vehicle, friction material disposed on the backing plate to form a brake surface that engages a wheel of the vehicle, and at least one wheel conditioning insert disposed within the friction material. The at least one wheel conditioning insert includes a conditioning surface configured to face the wheel, opposite first and second sides intersecting the conditioning surface, and opposite third and fourth sides intersecting the conditioning surface. Each of the first and second sides extends from the third side to the fourth side. The at least one wheel conditioning insert includes one or more of (a) a recess extending into one or more of the first side, the second side, the third side, or the fourth side and is configured to receive friction material of the friction device and/or (b) a protrusion extending out of the first side, the second side, the third side, or the fourth side and into the friction material of the friction device.

BRIEF DESCRIPTION OF THE DRAWINGS

The inventive subject matter may be understood from reading the following description of non-limiting embodiments, with reference to the attached drawings, wherein below:

FIG. 1 is a top view of a friction device;

FIG. 2 is a side view of the friction device shown in FIG. 1;

FIG. 3 is a cross-sectional view of the friction device shown in FIG. 1 along line in FIG. 1;

FIG. 4 is a cross-sectional view of the friction device shown in FIG. 1 along line IV-IV in FIG. 1;

FIG. 5 is a cross-sectional view of the friction device shown in FIG. 1 along line V-V in FIG. 2;

FIG. 24A is a perspective view of another example of a wheel conditioning insert;

FIG. 24B is a bottom view of the wheel conditioning insert shown in FIG. 24A;

DETAILED DESCRIPTION

Figure 6:
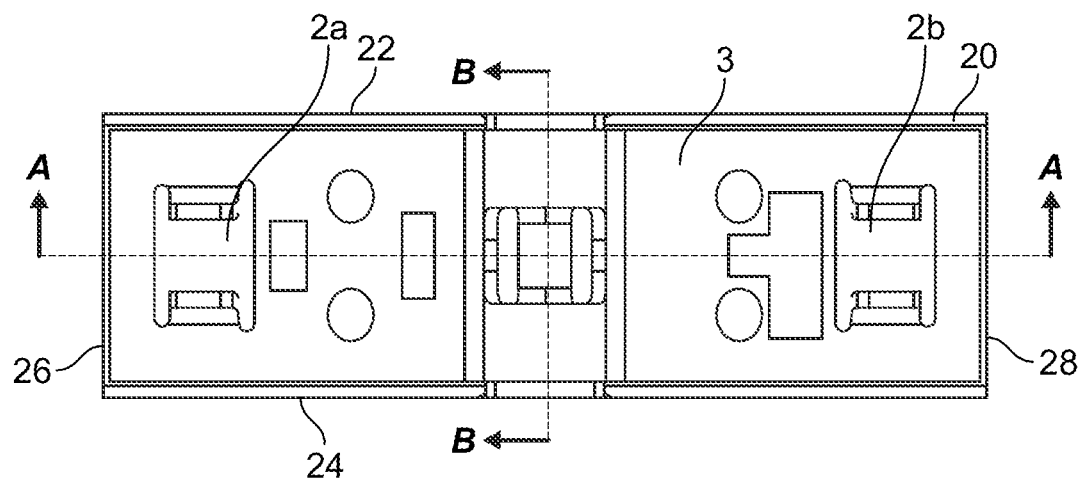
FIG. 6 is a top view of a friction device according to one embodiment of the inventive subject matter.

One or more embodiments of the inventive subject matter described herein provide a friction device for use on a vehicle. A suitable friction device can be a brake shoe, for example, and the vehicle may be a railway vehicle. In other embodiment, the vehicle can be another type of vehicle. The friction device may include a number of subcomponents, some of which may be optional. These components may include a backing plate, a composition friction material, a conditioning insert, a flange, a rejection lug, a key bridge, an adhesive layer, wear indicators, and the like.

When deployed, the backing plate may interface with and couple to a brake head of the vehicle. The composition friction material that is disposed onto the backing plate may define a brake surface that can engage with a wheel of the vehicle. The friction from the engagement can be controlled by the brake head. When engaged the brake surface retards the rotation of the wheel and can slow (or stop) the vehicle.

The composition friction material can define a pad or brake pad. The composition friction material may have a longitudinal flange side, a longitudinal rim side, and two opposing ends, two longitudinal ends, and two lateral ends. At least the two longitudinal ends may have a plurality of protrusions that may engage with the composition friction material at a distance away from the backing plate. Additionally or alternatively, the two lateral ends may include a plurality of protrusions that may engage with the composition friction material at a distance away from the backing plate. The plurality of protrusions may be elongated columns such as pegs with a base portion extending from the longitudinal ends and a head portion extending from the base portion. The plurality of protrusions may be elongated fins extending along the longitudinal ends. The lateral ends may further define at least one groove extending at least partially into the wheel conditioning insert to receive the composition friction material therein. In one embodiment, the friction device may include one or more wheel conditioning insert disposed within the composition friction material. The at least one wheel conditioning insert may be formed of a material different than the composition friction material.

Another example of a friction device may include a backing plate adapted to interface with a brake head of a vehicle and a composition friction material disposed onto the backing plate to form a brake surface of the friction device for engaging a wheel of the vehicle. The composition friction material may have a longitudinal flange side, a longitudinal rim side, and two opposite ends. The friction device may include at least one wheel conditioning insert disposed within the composition friction material including a base portion having a first side nearest the backing plate, a second side extending from the first side in a direction toward the brake surface, and a longitudinal axis. A first insert body extends from the second side of the base portion and offset from the longitudinal axis in the direction of the longitudinal flange side. A second insert body extends from the second side of the base portion and offset from the longitudinal axis in the direction of the longitudinal rim side. The first insert body and the second insert body each comprise two longitudinal ends, two lateral ends, and a wheel conditioning surface for engaging the wheel of the railway vehicle.

The portion of the system that is the composition friction material has a longitudinal flange side, a longitudinal rim side, and two opposite ends, and at least one wheel conditioning insert disposed or embedded within the composition friction material. The wheel conditioning insert can include a wheel conditioning surface for engaging the wheel of the vehicle, two longitudinal ends, and two lateral ends. At least the two lateral ends of the insert further define at least one groove extending at least partially into the wheel conditioning insert to receive the composition friction material therein. The groove(s) may include a plurality of grooves vertically stacked atop each other along the lateral ends. The groove(s) may at least partially extend into the wheel conditioning insert along the two longitudinal ends. The groove(s) may include a plurality of grooves vertically stacked atop of each other along the two lateral ends and the two longitudinal ends. The friction device may include a plurality of protrusions extending from the two longitudinal ends. The plurality of protrusions may be elongated fins that may engage with the composition friction material.

The two longitudinal ends of the first and second insert bodies may include a plurality of protrusions configured to engage with the composition friction material at a distance away from the backing plate. The plurality of protrusions may be columns including a base portion extending from the two longitudinal ends and a head portion extending into the composition friction material. At least the two lateral ends of the first and second insert bodies may define at least one groove extending at least partially into the wheel conditioning insert to receive the composition friction material. The two longitudinal ends of the first and second insert bodies may include a plurality of protrusions configured to engage with the composition friction material. The wheel conditioning surfaces of the first and second insert bodies may extend beyond the brake surface of the composition friction material. The at least one wheel conditioning insert may be connected to the backing plate. During operation, the fins may act as a wear indicator insofar as they visibly protrude at or near a rejection or condemnation line at which the composition friction material should be replaced. Fins may be more thermally conductive than the composition friction material and may act as thermal conduits to pipe heat out from the body of the composition friction material and radiate it to the environment. Fins may be configured to create additional surface area for securing the composition friction material to the backing plate.

In one embodiment, the friction device for use on a vehicle can include a backing plate adapted to interface with a brake head of a vehicle, and a composition friction material disposed onto the backing plate to form a brake surface of the friction device for engaging a wheel of the vehicle. The composition friction material may have a longitudinal flange side, a longitudinal rim side, and two opposite ends.

The lateral ends may define at least one groove extending at least partially into the wheel conditioning insert to receive the composition friction material therein. Optionally, there can be a plurality of grooves stacked vertically atop of each other along the two lateral ends. The at least one groove can extend at least partially into the wheel conditioning insert along the two longitudinal ends. The at least one groove can include a plurality of grooves stacked vertically atop of each other along the two lateral ends and the two longitudinal ends. The friction device may include a plurality of protrusions extending from the two longitudinal ends. The plurality of protrusions can be elongated fins configured to engage with the composition friction material.

In one embodiment, the backing plate may interface with a brake head of a vehicle, and a composition friction material disposed onto the backing plate to form a brake surface of the friction device for engaging a wheel of a vehicle. The friction device can include at least one wheel conditioning insert disposed within the composition friction material including a wheel conditioning surface for engaging the wheel of the railway vehicle, two longitudinal ends, and two lateral ends. At least the two longitudinal ends comprise a plurality of protrusions configured to engage with the composition friction material at a distance away from the backing plate.

The two lateral ends can include a plurality of protrusions that may engage with the composition friction material at a distance away from the backing plate. The plurality of protrusions may include columns having a base portion extending from the longitudinal ends and a head portion extending from the base portion. The plurality of protrusions can be elongated fins extending vertically along the longitudinal ends. The lateral ends may further define at least one groove extending at least partially into the wheel conditioning insert to receive the composition friction material therein. The wheel conditioning insert can be formed of a material different than the composition friction material.

In one embodiment, the friction device for use on a vehicle can include a backing plate adapted to interface with a brake head of a vehicle, and a composition friction material disposed onto the backing plate to form a brake surface of the friction device for engaging a wheel of the vehicle. In one embodiment, the friction device may include at least one wheel conditioning insert disposed within the composition friction material. The insert may include a base portion having a first side nearest the backing plate, a second side extending from the first side in a direction toward the brake surface, and a longitudinal axis. A first insert body extends from the second side of the base portion and offset from the longitudinal axis in the direction of the longitudinal flange side. A second insert body extends from the second side of the base portion and offset from the longitudinal axis in the direction of the longitudinal rim side. The first insert body and the second insert body each comprise two longitudinal ends, two lateral ends, and a wheel conditioning surface for engaging the wheel of the vehicle.

The two longitudinal ends of the first and second insert bodies can include a plurality of protrusions may engage with the composition friction material at a distance away from the backing plate. The plurality of protrusions can include columns having a base portion extending from the two longitudinal ends and a head portion extending into the composition friction material. The plurality of protrusions can be elongated fins.

The lateral ends of the first and second insert bodies can define at least one groove extending at least partially into the wheel conditioning insert to receive the composition friction material. The longitudinal ends of the first and second insert bodies can include a plurality of protrusions may engage with the composition friction material.

The wheel conditioning surfaces of the first and second insert bodies can extend beyond the brake surface of the composition friction material. The at least one wheel conditioning insert can be connected to the backing plate.

The subject matter described herein provides friction devices having at least one bonded insert having various features to improve the bonding between the insert and the composition friction material that makes up a majority of the volume of the friction device. Unlike other friction devices, the inventive friction devices described herein may provide an advantageous conditioning surface for a wheel surface while maintaining improved boding characteristics between the wheel insert responsible for the conditioning and the composition friction material responsible for supplying a braking force to the wheel.

Figure 7A:
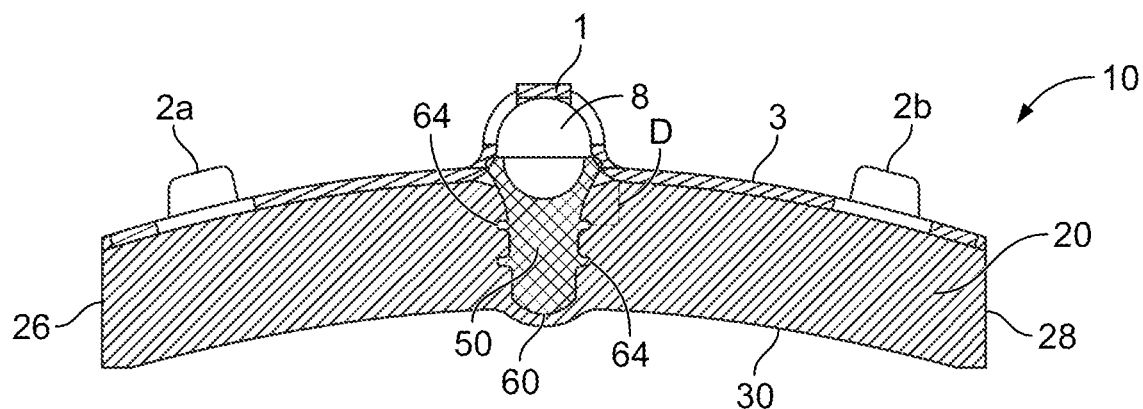
FIG. 7A is a cross-sectional view of the friction device shown in FIG. 6 along line A-A in FIG. 6 and having one example of a wheel conditioning insert.
Figure 7B:
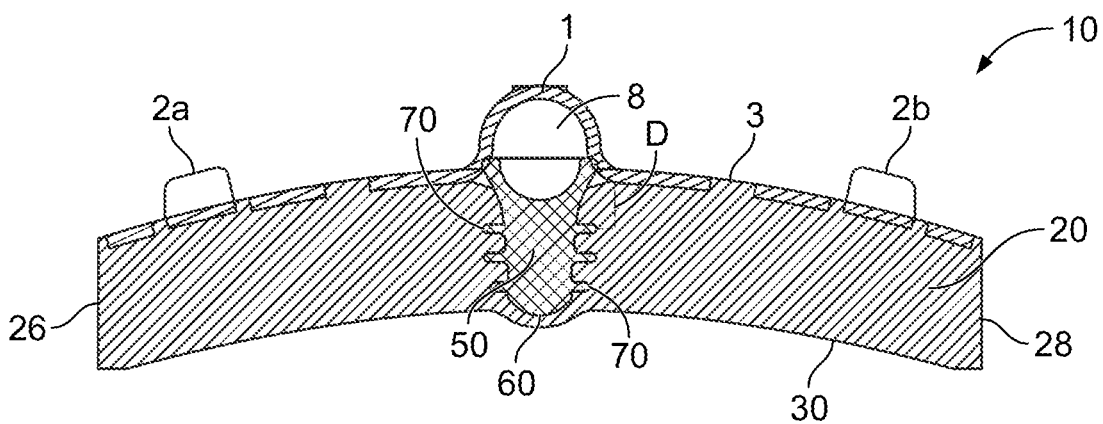
FIG. 7B is a cross-sectional view of the friction device shown in FIG. 6 along the line A-A in FIG. 6 having another example of a wheel conditioning insert.
Figure 8:
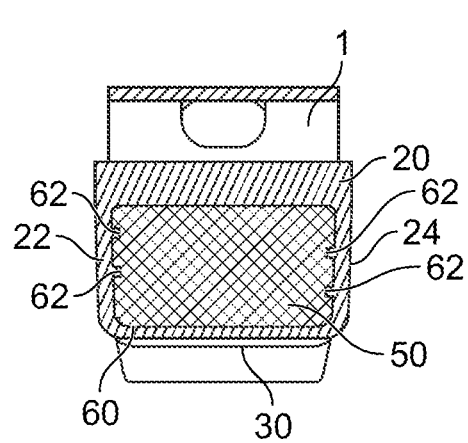
FIG. 8 is a cross-sectional view of the friction device shown in FIG. 6 along line B-B.

Referring to FIGS. 6 through 8, a friction device in accordance with at least one embodiment of the inventive subject matter is illustrated. The backing plate may be arcuate in shape so as to permit the friction device to properly interact against a wheel (not shown) of a vehicle. The backing plate may include a pair of rejection lugs 2a, 2b. The rejection lugs may be integrally formed with the backing plate, and may extend from a top surface of the backing plate. The rejection lugs are sized and positioned in such a way so as to mate with corresponding rejection lug receptacles (not shown) on a corresponding brake head (not shown). The rejection lugs may be may be compatible with a variety of brake heads or they may be configured so as to only correspond with a certain type of brake head in order to prevent the installation of the friction device on an improper brake head.

In one embodiment, the friction device may include a key bridge. A suitable key bridge may be integrally formed with the backing plate in one embodiment. In another embodiment, it may be attached to the backing plate prior to installation of the friction device to the brake head. Like the backing plate, the key bridge may be made of a metallic material or a reinforced composite material. The key bridge may be coupled to a brake head (not shown) of a vehicle. An opening 8 in the key bridge may accept a locking key (not shown) which fastens the friction device to the vehicle brake head. In the illustrated embodiment, the key bridge may be generally circular, but in other embodiments the key bridge may take a shape to facilitate fastening of the key bridge to the brake head.

The friction device may include a composition friction material 20. The composition friction material may be affixed to and extends from the backing plate along the surface opposite the rejection lugs and key bridge 4. The composition friction material can include an adhesion layer (not shown) to facilitate proper fixture to the backing plate. Optionally, the composition friction material may be affixed to the backing plate by another technique.

The composition friction material may have a flange side 22 facing a flange (not shown) of a wheel, a rim side 24 facing a rim of the wheel (not shown), and first and second opposite ends 26, 28. The flange and rim sides extend along the length of the friction device, and the opposite ends extend between and connect the flange and rim sides. The flange, if present, may extend from the brake show and ride over the wheel flange. This may align the brake shoe with the wheel during use.

The composition friction material forms a brake surface 30 of the friction device. The brake surface contacts the railway vehicle wheel tread to apply a braking force to the vehicle. The brake surface may contact parts or all of the vehicle wheel tread, wheel flange, and/or wheel rim. The composition friction material generally takes the arcuate shape of the backing plate so as to properly interact against a railway vehicle wheel or wheel tread. The brake surface may take the arcuate shape of the backing plate. The composition friction material may be a composite material that provides the required friction and braking effort when forced against the wheel. The material providing the braking force can be a composite material or may be a metal or metal alloy that can apply the proper braking force to the wheel. Material selection may be determined with reference to the vehicle type and the vehicle's duty use and operating environment.

Figure 9:
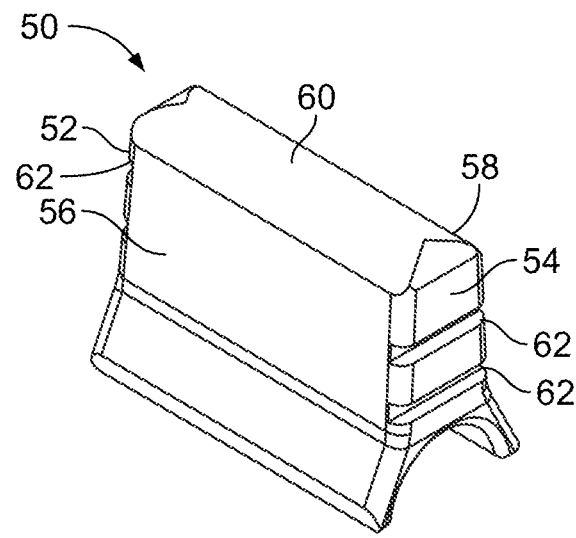
FIG. 9 is a perspective view of another example of a wheel conditioning insert.

At least one wheel conditioning insert may be disposed in the composition friction material to provide braking and wheel conditioning features to the friction device. Referring to FIGS. 7A through 10, a first embodiment of a wheel conditioning insert 50 is shown. As shown in FIG. 9, the wheel conditioning insert may include a body having different sets of opposite sides, such as a first lateral end or side 52 and an opposite second lateral end or side 54, a first longitudinal end or side 56 and an opposite second longitudinal end or side 58, and a wheel conditioning surface or side 60 and an opposite curved and radially inward side (e.g., the bottom side of the body shown in the Figures). The first and second lateral ends or sides extend across the wheel conditioning insert, and the first and second longitudinal ends or sides extend between the first and second lateral ends or sides. As shown, each of the longitudinal sides connects and extends between the lateral sides and each of the lateral sides connects and extends between the longitudinal sides. The longitudinal sides extend along opposite edges of the wheel conditioning surface and the lateral sides extend along other opposite edges of the wheel conditioning surface. The longitudinal sides may be angled toward each other and toward the wheel conditioning surface. As shown in FIG. 8, the wheel conditioning surface extends generally between the flange side and the rim side of the composition friction material. FIGS. 7A through 8 show the wheel conditioning insert encapsulated by the composition friction material and the wheel conditioning surface covered by the composition friction material. In this instance, over repeated uses of the friction device, the composition friction material will wear away and eventually expose the wheel conditioning surface. The wheel conditioning surface may be flush with the brake surface and exposed to the wheel prior to the first use of the friction device.

The insert may be coupled with a backing plate. As one example, the insert may be welded to the backing plate (e.g., mig welding, tig welding, arc welding, spot welding, laser welding, etc.). As another example, the insert can be coupled with the backing plate using a snap-in or snap fit connection with the insert being pushed into the plate and locked in. As another example, the backing plate and insert may be formed as a single body. Optionally, the insert can be cast around a steel plate or wire form, or the insert may be press fit into the backing plate. In one embodiment, a structural adhesive may be used to attach the insert to the backing plate.

Suitable backing plates may be made of metallic material or non-metallic material, or a combination or composite material. In one embodiment, the backing plate may be made of metallic material. Suitable metallic materials may include iron and iron alloys. Suitable iron alloys may include steel. In other embodiments, the backing plate may be made of reinforced composite materials. The backing plate may be coated. Suitable coatings my include galvanic coatings (particularly if the backing plate is formed of a corrodible metal), paint, and anodized layers. Suitable paints include enamel, epoxy, and powder coatings. The backing plate may be curved axially so as to follow the curvature of a wheel. The axis for the curve may be a wheel axis. In one embodiment, the friction structure may be curved and may be coaxial to the wheel, while the backing plate follows the curve of the friction structure to be coaxial to the wheel. In another embodiment, the backing plate may be curved but is not coaxial with the wheel or with the working surface of the friction structure. The degree of separation of the curvature of the backing plate relative to the friction structure may be selected based on application specific parameters.

The backing plate may have surfaces that are relatively smooth, and may have one or more defined apertures therethrough and/or protrusions extending therefrom. In one embodiment, the backing plate may be undulate so as to increase its surface area. An increased surface area may provide more bonding surface to which the friction structure may bond. The undulations may be dispersed evenly across the backing plate, or may be patterned so that some undulations are at a proximate edge or some undulations are concentrated nearer the center line. The undulations may run the length of the backing plate, or may be oriented widthwise. Undulations may impart stiffness in the direction of their run, and flexion perpendicular to their run. In one embodiment, the undulations direction may be skew relative to the length and the width of the backing plate. In one embodiment, a checkered pattern or equivalent may be present to allow for control over the stiffness and the flexion of the backing plate while still increasing the surface area. Various patterns and similar effects can be created by selecting either a uniform thickness of the backing plate (and thus by bends in the plate) or by using non-uniform thicknesses across the backing plate.

In one embodiment, the width of the backing plate may be the same as the width of the friction structure. In another embodiment, the width of the backing plate differs from the width of the friction structure. A backing plate that may be smaller than the width of the friction structure may be sufficient to perform the support function of the backing plate, while reducing overall weight and/or cost. A backing plate that is larger than the width of the friction structure may be sufficient to perform the support function of the backing plate, while providing enhanced support to edges of the friction material. In one embodiment, the width ratio of the backing plate to the friction structure, the length ratio of the backing plate to the friction structure, and the ratio of the backing plate's thickness to a starting thickness of the friction structure is, independently of each other, in a range of less than about 0.5, in a range of from about 0.6 to about 0.9, about 1, in a range of from about 1.1 to about 1.2, in a range of from about 1.2 to about 1.5, or in a range of greater than about 1.6. Suitable backing plate configurations may include a full unbroken plate, a mesh, a wire form, a reinforced wire form, a mesh, or a molded composite.

In one embodiment, the width of the brake shoe's friction structure's working surface relative to the wheel tread (which may include at least a portion of the wheel flange that touches the brake shoe during use) may be in a range of less than about 35%, in a range of from about 36% to about 50%, in a range of from about 51% to about 75%, in a range of from about 76% to about 100%, or greater than about 101%. A suitable brake shoe width may vary from side to side or from end to end. A suitable shape of the friction structure may follow a contour of wheel, having a matching complimentary profile. This shaped edge may be formed with one or more of a chamfer, ridge, edge, or radius. In one embodiment, only one edge of the friction structure may be contoured. In another embodiment, both edges are contoured to allow for installation in either orientation. In one embodiment, the brake shoe may fit to a new railway vehicle wheel. A new railway vehicle wheel may have a diameter in a range of less than about 600 mm, in a range of from about 601 mm to about 1300 mm, or in a range of greater than about 1301 mm.

The manufacture of the backing plate may be accomplished using casting or metal stamping, or even machining In one embodiment, the backing plate may be manufactured using additive technology. Using additive technology, various components may be produced together as a single monolithic structure. Accordingly, the rejection lug, the key bridge, and the conditioning insert can be created along with the backing plate as a single seamless piece.

An example of a suitable friction structure may include, or friction composition material may be, a brake pad. The brake pad may be useful to slow or stop a vehicle. Suitable vehicles may include automobiles, trucks, busses, mining equipment, aircraft and railway vehicles. Railway vehicles may include locomotives and railcars, and may be for transport of freight and/or passengers. The friction structure may be formed of a composition friction material. Embodiments of the invention may be suitable for use with locomotives, other railway vehicles, or other vehicles. In other embodiments, the use is suited for automobiles, buses, trucks, agricultural equipment, mining equipment, and the like.

In one embodiment, a suitable friction material may be rated for a Rubbing Pressure (RP) in a range of less than about 800 N/cm2, in a range of from about 801 N/cm2 to about 1000 N/cm2, in a range of from about 1001 N/cm2 to about 1500 N/cm2, or greater than about 1501 N/cm2. In one embodiment, a suitable friction material may be rated for a Rubbing Speed (RV) in a range of less than about 20 m/s, in a range of from about 21 m/s to about 30 m/s, in a range of from about 31 m/s to about 50 m/s, or greater than about 51 m/s. In one embodiment, a suitable friction material may be rated for Continuous Temperature operation (CT) in a range of from about 300° C. to about 350° C., from about 351° C. to about 400° C., from about 401° C. to about 450° C., or greater than about 451° C. In one embodiment, a suitable friction material may be rated for Short Term Temperature (ST) in a range of from about 500° C. to about 600° C., from about 601° C. to about 700° C., from about 701° C. to about 800° C., from about 801° C. to about 900° C., or greater than about 901° C. The preceding ranges may be based at least in part on, and determined by, the friction material selection, the physical configuration, and the end use application of the friction device.

In other embodiments, a suitable friction structure may include be semi-metallic. Semi-metallic may include a non-metallic matrix, such as a ceramic or a polymer, with a metallic filler. For example, a semi-metallic puck of iron or copper powder may be bound together by a ceramic or polymer. The fill content may be selected based at least in part on the desired performance of the friction material and friction structure made therefrom. Suitable filler content may be expressed as a ratio of metallic material to matrix material by volume or by weight. In various embodiments, a suitable ratio may be in a range of less than 50% by weight, in a range of from about 51% to about 75% by weight, from about 76 to about 90% by weight, or greater than 91% by weight. For example, a suitable formulation may be 90 grams of metal per 10 grams of matrix. In various embodiments, the fill content for the friction structure may be metal, as disclosed, a non-metal, or a combination of metal and non-metal materials.

The ceramic/iron materials may be mixed, compressed and/or sintered at a high temperature to form a solid friction structure. Suitable binding or matrix materials may include one or more of resin (such as phenol formaldehyde), graphite (which can serve as a friction material, zirconium silicate and the like. An example formulation, including binder, is shown in Table 1.

| Constituent | Approx. range % by weight |
|---|---|
| Aluminum Silicate | 25-35 |
| Bronze particles | 10-20 |
| Graphite | 5-15 |
| Vermiculite | 10-20 |
| Phenolic resin | 10-20 |
| Steel fibers | 3-7 |
| Rubber particles | 3-7 |
| Silicon dioxide particles | 1-5 |
| Aramid fibers | 1-5 |

The powder size, fiber size, concentration distribution, grain size distribution, and morphology may be selected or controlled to affect performance of the friction structure. If the fill content is a powder, suitable powder size averages may be in a range of less than 100 micrometers, in a range of from about 101 micrometers to about 250 micrometers, in a range of from about 251 micrometers to about 500 micrometers, or greater than about 501 micrometers. The grain size distribution may be in a range of from about 0.5 to about 1, from about 1 to about 2, or greater than about 2 as a distribution relative to mean particle size. The morphology of the particles may be selected from suitable shapes. Suitable shapes may include spherical, ovoid, irregular, flake, and polygonal. In some examples the more surface area of the particle, the lower the friability of the friction structure; and in other examples, the more edged particles provide relatively more aggressive friction and conditioning than the smoother or rounder particles. The hardness of the material selected as the filler powder, in combination with the filler content, and particle morphology can contribute to the performance of the friction structure. If the fill content is a fiber, the fiber thickness and fiber length may be selected or controlled to affect performance. The fiber may be the same material as the powder fill content, and the fill content may be a mixture of powder and fiber in one embodiment. Other suitable fibers may be formed from an aromatic polyamide or aramid, such as Kevlar™, Twaron™, Nomex™, and Technora™. Other suitable fibers may be formed from an aliphatic or semi-aromatic polyamides, such as Nylon™. Polymeric fibers may include one or more copolymers to control and affect crystallinity, melting or softening points, and the like. The length of the fibers may be controlled to affect performance. Suitable fiber lengths may be in a range of less than about 1 millimeter (mm), in a range of from about 1.1 mm to about 2 mm, in a range of from about 2.1 mm to about 5 mm, or in a range of greater than about 5.1 mm. Fiber thickness may be selected to control and affect performance. Suitable fiber thickness may be in a range of from about In one embodiment, the fibers have a Denier in a range of less than about 20 d, in a range of from about 21 d to about 100 d, in a range of from about 101 d to about 500 d, in a range of from about 501 d to about 1500 d, in a range of from about 1501 d to about 3000 d, or greater than about 3000 d selected based at least in part on application specific parameters.

Suitable polymer or polymeric matrices may include phenolics, urea-formaldehyde, epoxy, cyanate ester, aromatic heterocyclics (such as Polyimides, polybenzoxazoles (PBOs), polybenzimidazoles, and polybenzthiazoles (PBTs)), inorganic and semiorganic polymers (such as may be derived from silicon-nitrogen, boron-nitrogen, and phosphorus-nitrogen monomers), and silicon-based polymers, as well as mixtures and copolymers of the foregoing. The polymeric matrix, along with other additives, may include a flame retardant. Suitable flame retardants may include a composition having one or more of aluminum, phosphorus, nitrogen, antimony, chlorine, bromine, and in some applications magnesium, zinc and carbon.

In one embodiment, the friction material is a relatively low-dust producing material. Suitable low-dust friction materials may ablate in a controlled fashion so as to create particulate matter of determined size and/or morphology.

A suitable friction structure may be affixed to and extends from the backing plate along the surface opposite the rejection lugs and key bridge. In one embodiment, to be affixed to the backing plate the friction structure may include an adhesion layer (not shown) to facilitate proper fixture to the backing plate. In one embodiment, the friction material may be affixed via mechanical means with, or without, an adhesive layer. The friction structure may be affixed to the backing plate by means that may be selected based at least in part on the application specific parameters.

A suitable friction structure may include an outer layer that may be the first to contact a wheel surface when newly installed. This outer lay may perform one or more of the following functions: prevent exposure of the friction material during storage, transport or installation to corrosion, chipping, moisture or fouling; provide an initial coating to the wheel surface on the first few rotations after installation and braking to condition or treat the wheel surface; to condition the wheel surface and remove any debris or corrosion; to fill in cracks, pits and defects in the wheel surface; and the like. In one embodiment, the outer layer may be removed from the working surface of the friction structure through friction in the first few rotations during braking after installation. In one embodiment, the outer layer may be peeled off after installation or a part of the installation process.

The friction structure may include one or more wear indicators. In one embodiment, the wear indicators are molded into the friction material of the friction structure. A suitable location for the wear indicator may be at the back of the shoe. The backing plate may be may form the wear indicator, or may have material removed to allow a wear indicator to be visible. Other suitable locations for wear indicators may include proximate to an end, around a periphery, at the centerline of the friction structure, at a distal end (or both ends) of the friction structure, as a part of a conditioning insert, or the like. During use, the wear indicators allows an observer to determine useful life of the friction structure. In one example, a groove may be formed in the friction structure from the working surface down to a determined depth. During use, the depth of the groove diminishes as the working surface may be worn away. An observer would then look for the groove and determine life by its remaining depth (or absence if it was at end of life and completely worn away). Other examples of wear indicators may include a differently colored portion of the friction structure. Or, the conditioning insert may itself perform the wear indication function.

In one embodiment, an RFID chip (or equivalent) is disposed in the friction structure at the depth for which the end of life is set for the friction structure. When the friction structure is worn to expose the RFID chip, the chip will no longer function and provide a signal in response to a query (for passive chips, active chips may broadcast signals and the absence of a broadcast signal would indicate end-of-life). Naturally, an RFID sensor would communicate with the wear indicator chip and thereby one could determine when a brake change was needed.

A conditioning insert material and other parameters may be selected with reference to the conditioning function and the friction material may be selected with reference to the braking or friction function. Thus, they may contain similar materials in some embodiments, but the compositions differ such to perform their intended function. This difference may be substantial (e.g., a metal conditioning insert within a composite friction structure) or may be relatively subtle (e.g., both are ceramic iron metal-filled structures, with one having a different concentration of metal content). In one embodiment, the conditioning insert may be formed of a material relatively harder and/or more abrasive than the friction structure. For example, the wheel conditioning insert may be formed of a material with suitably abrasive properties for the wheel conditioning insert. As the brake shoe may be applied to the surface of a wheel, the wheel conditioning insert rubs against the wheel surface. The abrasive properties of the insert work to condition the wheel surface to prevent, reduce, or remove defects.

A suitable wheel conditioning insert may be formed from a relatively hard material. Suitable materials may be metallic materials. Suitable metals may include one or more of Al, Si, P, S, Cl, Ti, V, Cr, Mn, Fe, Co, Ni, Cu, Zn, Mo, Sn, Sb, Tl, and oxides, carbides, and alloys of the foregoing. In one embodiment, the metal may be iron or an iron alloy. Suitable iron, and iron alloys, may include those as used in, and process to form, cast iron, forged iron, wrought iron and the like. Suitable cast iron may include malleable cast iron or ductile cast iron. Other suitable iron inserts include treated iron, regardless of its manufacturing process. Suitable treated irons may include phosphated iron, nitrided iron, heat treated iron, and the like. Some steels may be used in various embodiments. The steel may have controlled amounts of carbon and/or chromium, as well as a controlled ratio of martensite relative to cementite structure. Selecting the alloy content may control the hardness, and therefore the performance of the conditioning insert. In other embodiments, the conditioning insert may include a non-ferrous metal.

In other embodiments, a suitable conditioning insert may include a non-metallic matrix, such as a ceramic or a polymer. In one embodiment, it comes with a metallic filler. For example, a puck of iron powder or iron filling filled ceramic may be used. The iron may be the same, or different, from the identified suitable iron types. The fill content may be selected based at least in part on the desired performance of the conditioning insert. Suitable filler content may be expressed as a ratio of metallic material to matrix material by volume or by weight. In various embodiments, a suitable ratio may be in a range of less than 50% by weight, in a range of from about 51% to about 75% by weight, from about 76 to about 90% by weight, or greater than 91% by weight. For example, a suitable formulation may be 90 grams of iron powder per 10 grams of ceramic matrix. The ceramic/iron materials may be mixed, compressed and sintered at a high temperature to form a solid conditioning insert. The powder size and grain size distribution may be controlled to affect performance, as well. Suitable powder size averages may be in a range of less than 100 micrometers, in a range of from about 101 micrometers to about 250 micrometers, in a range of from about 251 micrometers to about 500 micrometers, or greater than about 501 micrometers. The grain size distribution may be in a range of from about 0.5 to about 1, from about 1 to about 2, or greater than about 2 as a distribution relative to mean particle size. The morphology of the particles may be selected from suitable shapes. Suitable shapes may include spherical, ovoid, irregular, flake, and polygonal. In some examples the more surface area of the particle, the lower the friability of the conditioning insert; and in other examples, the more edged particles provide relatively more aggressive friction and conditioning than the smoother or rounder particles. The hardness of the material selected as the filler powder, in combination with the filler content, and particle morphology can contribute to the performance of the conditioning insert. In one embodiment, the wheel conditioning insert may be formed of a material relatively harder and/or more abrasive than the friction material. For example, the wheel conditioning insert may be formed of a material with suitably abrasive properties for the wheel conditioning insert. As the brake shoe may be applied to the surface of a wheel, the wheel conditioning insert rubs against the wheel surface. The abrasive properties of the insert conditions the wheel surface to prevent, reduce, or remove defects.

Although various wheel conditioning inserts are shown, other embodiments may have a different number (e.g., more or fewer) of wheel conditioning inserts utilized along the rim side that may be determined with reference to application specific parameters. Further, in other embodiments, these inserts may have a shape other rectangular and selected to condition the wheel rim. Other suitable shapes may be selected with reference to the desired performance, but polygonal and ovoid shapes may be broadly useful across use types. The wheel conditioning surface may remove imperfections from the wheel when in use and/or may impart a coating layer on the subsequently conditions surface. The shape of the insert, the number of inserts, the insert material, and other factors (such as volume, weight, density, and end use application) may be selected to achieve a desired and proportional effect from the insert.

Additional features of the wheel conditioning insert to facilitate the mechanical bonding of the insert to the composition friction material of the friction device will now be described. These features may help to improve the shear and pull-off strength required to separate or loosen the wheel conditioning insert from the composition friction material. These bonding features may help to mitigate cracking in the composition friction material nearest the wheel conditioning insert.

As shown in FIGS. 8 and 9, a first example of these bonding features may be one or more grooves 62 or indentations within the wheel conditioning insert. (For clarity purposes, not all grooves are labeled in the drawings). The grooves may extend along the lateral ends or sides of the wheel conditioning insert. The grooves may be formed as linear recesses that are parallel to each other and that are oriented parallel to the wheel conditioning surface. Each of the grooves can extend into the lateral side and may continuously extend from one longitudinal side to the other longitudinal side without extending into either longitudinal side.

The grooves accept the composition friction material therein and improve the bonding characteristics between the composition friction material and wheel conditioning insert along the lateral ends. This is shown in FIG. 8, where the composition friction material extends into wheel conditioning insert in the space provided by the grooves.

Figure 10:
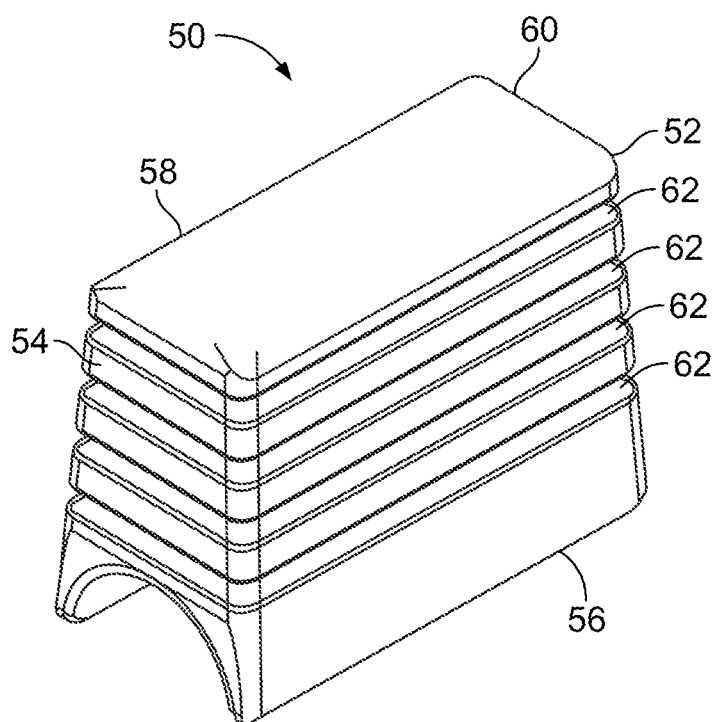
FIG. 10 is a perspective view of another example of a wheel conditioning insert.

As another example, as shown in FIG. 10, the grooves may further extend along one or both of the longitudinal ends or sides thus improving the mechanical bonding characteristics along the longitudinal ends. For example, the grooves may extend into all of the sides, while remaining parallel to each other. Each of the grooves may continuously extend through all of the sides, including through the intersections or edges between neighboring pairs of the sides.

The grooves may extend along any end or combination of ends of the wheel conditioning insert. Suitable grooves may take a shape to accept the composition friction material therein and to facilitate improved bonding between the composition friction material and the wheel conditioning insert. The grooves may have a length, width, or depth to accept at least some portion of the composition friction material therein. The grooves may be different from one another and need not be uniform in shape or organization along the wheel conditioning insert. For example, the grooves may be organized in columns as shown in FIGS. 9 and 10. However, the grooves may be staggered, disposed of vertically within the wheel conditioning insert, or be randomly aligned along the ends.

Figure 12:
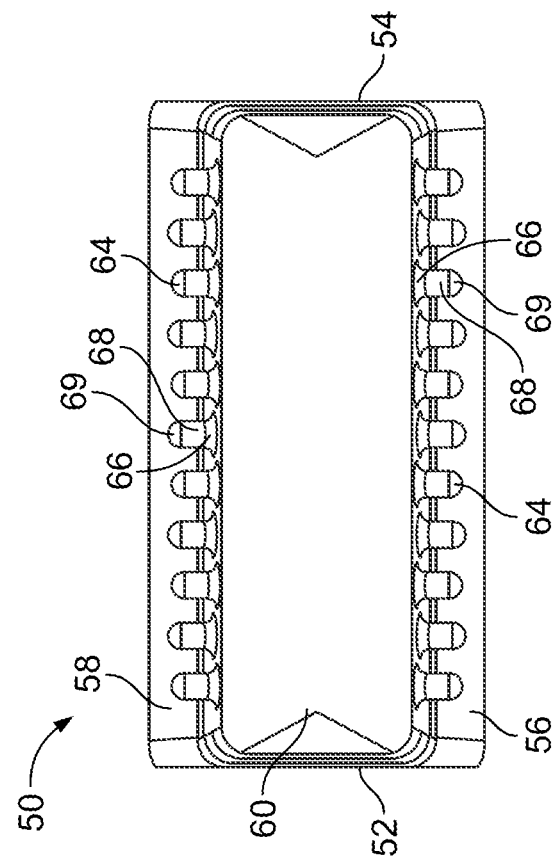
FIG. 12 is a bottom view of the wheel conditioning insert shown in FIG. 11.
Figure 11:
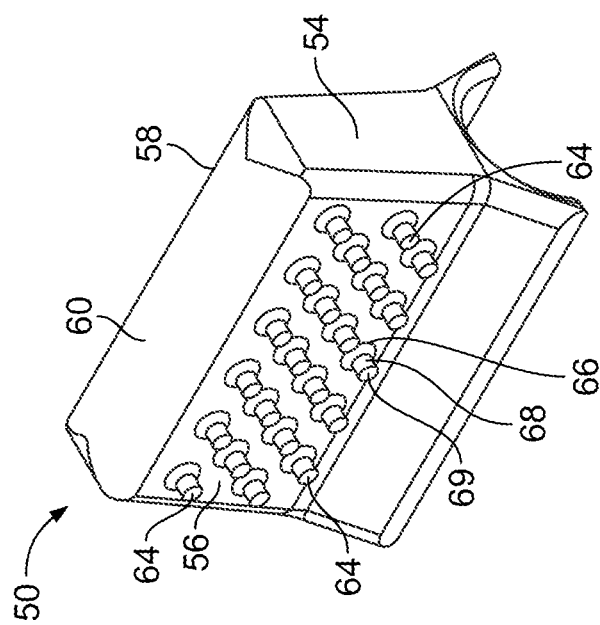
FIG. 11 is a perspective view of another example of a wheel conditioning insert.

Referring now to FIGS. 7A, 7B, and FIGS. 11 through 14, a second feature for improving mechanical bonding may include one or more protrusions 64, 70 extending from the wheel conditioning insert. (For clarity purposes, not all protrusions are labeled in the drawings). As shown in FIGS. 11 and 12, the one or more protrusions may extend from the longitudinal ends of the wheel conditioning insert. As shown in FIG. 7A, the protrusions extend from the longitudinal ends and into the composition friction material. The protrusions may take the form of a plurality of columns. The columns may include a base portion 66 attached to and extending from the longitudinal ends, a shaft portion 68 extending from the base portion, and a head portion 69 extending from the shaft portion. Each of the columns can be a peg having a cylindrical body with a rounded outer end. The columns may all protrude from the longitudinal side by the same distance so that all columns have an equivalent length (within manufacturing tolerances). The length of the columns is short relative to the length and/or width of the wheel conditioning insert. The extension of the columns into the composition friction material may serve to increase the pull-off or shear strength required to separate the composition friction material. While FIGS. 11 and 12 show the columns extending from the longitudinal ends of the wheel conditioning insert, the columns may extend from the lateral ends as well. The columns may be organized into rows or columns across the ends of the wheel conditioning insert, may be scattered about the ends, or may be organized in another manner.

Figure 14:
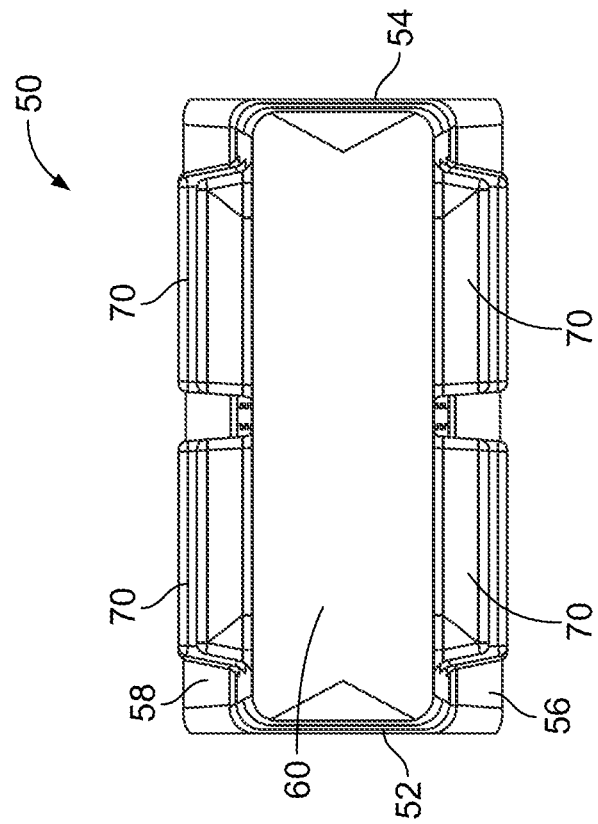
FIG. 14 is a bottom view of the wheel conditioning insert shown in FIG. 13.
Figure 13:
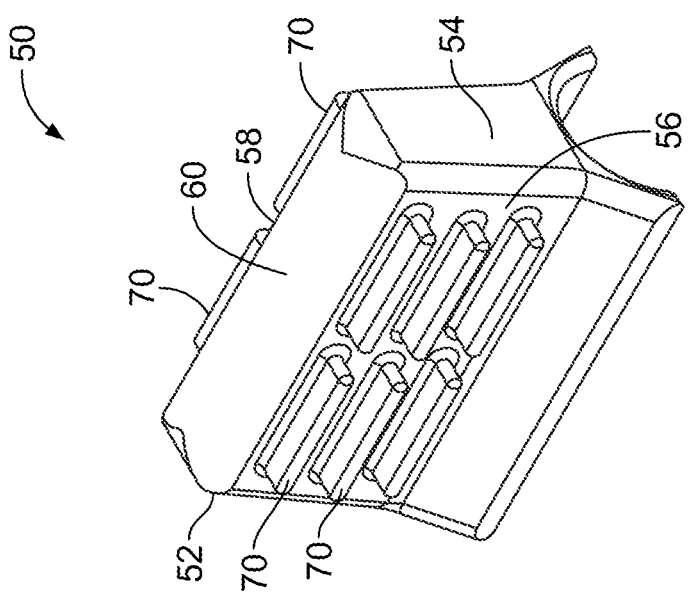
FIG. 13 is a perspective view of another example of a wheel conditioning insert.

Referring now to FIGS. 13 and 14, the protrusions may take the form of elongated fins 70. Like the columns, the fins extend into the composition friction material to improve the bonding characteristics of the composition friction material to the wheel conditioning insert. As shown in FIG. 7B, the fins extend from the longitudinal ends and into the composition friction material. The fins may extend across the entire length of the longitudinal ends or, as shown in FIGS. 13 and 14, the fins may be organized into columns along the longitudinal ends. While not shown, the fins may extend from the lateral ends. The fins may extend along the entire length of the longitudinal ends, or the fins may be staggered. The fins may extend in a direction perpendicular to or angled to the alignment shown in FIG. 13. Different organizational styles of the fins may be used as well.

The fins can be planar bodies that are oriented parallel to each other. As shown, the fins may not extend along the entire width of the longitudinal side. For example, each fin may extend along less than half the width of the longitudinal side. Alternatively, the fins may extend along the entire length of the longitudinal side from one lateral side to the other lateral side.

Figure 15B:
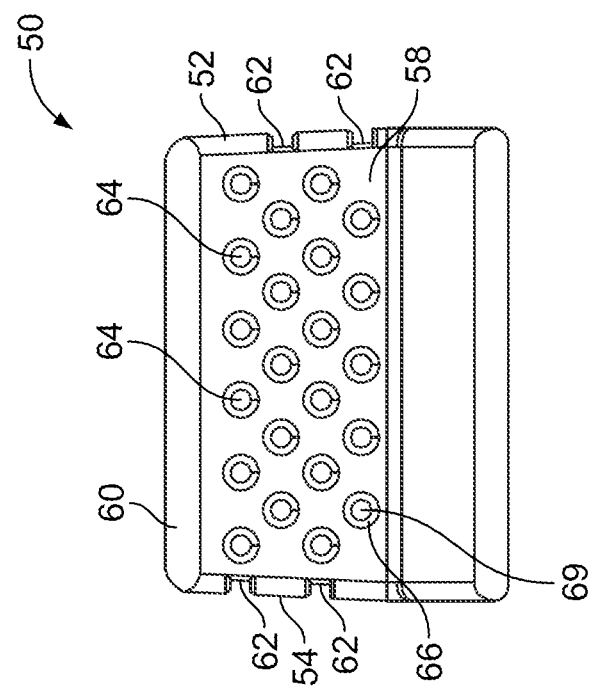
FIG. 15B is a side view of the wheel conditioning insert shown in FIG. 15A.
Figure 15A:
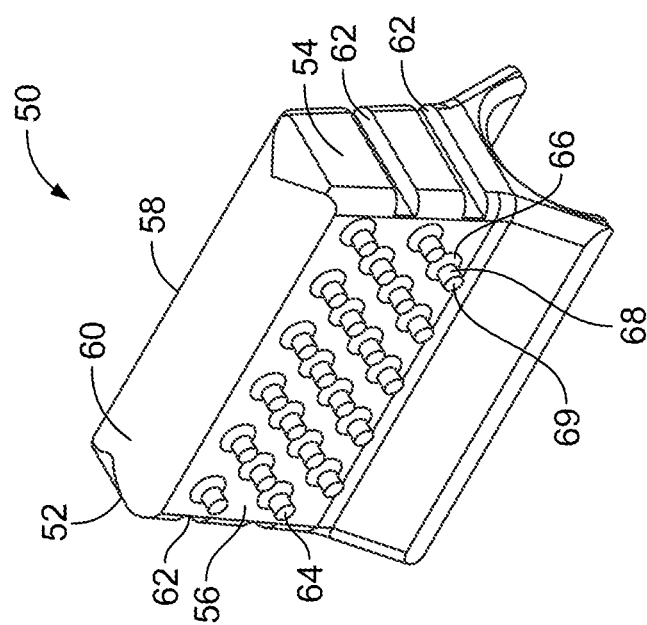
FIG. 15A is a perspective view of another example of a wheel conditioning insert.
Figure 16B:
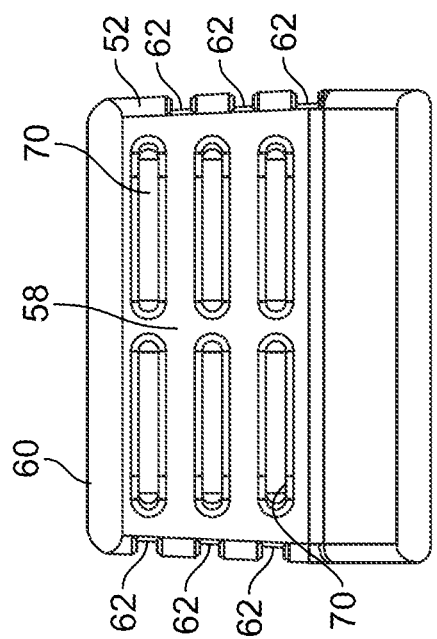
FIG. 16B is a side view of the wheel conditioning insert shown in FIG. 16A.
Figure 16A:
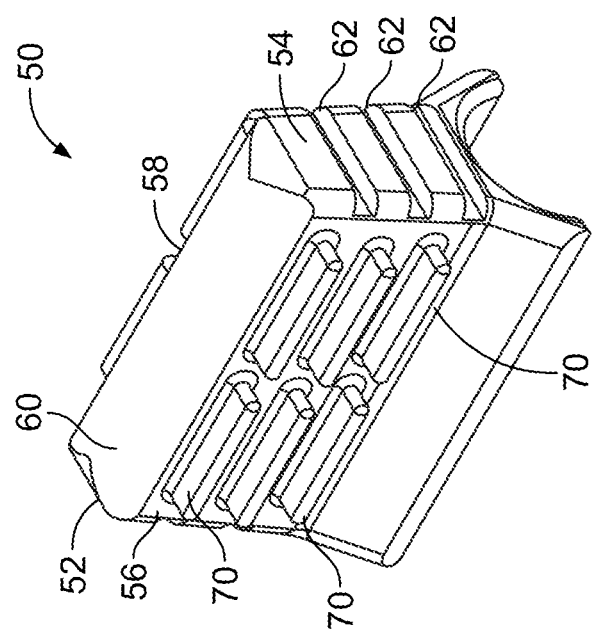
FIG. 16A is a perspective view of another example of a wheel conditioning insert.
Figure 17:
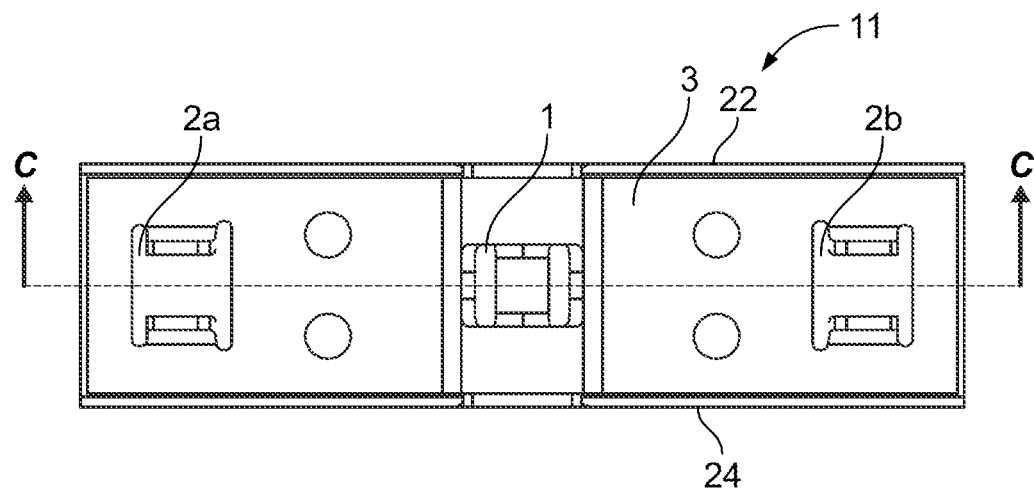
FIG. 17 is a top view of another example of a friction device.
Figure 18:
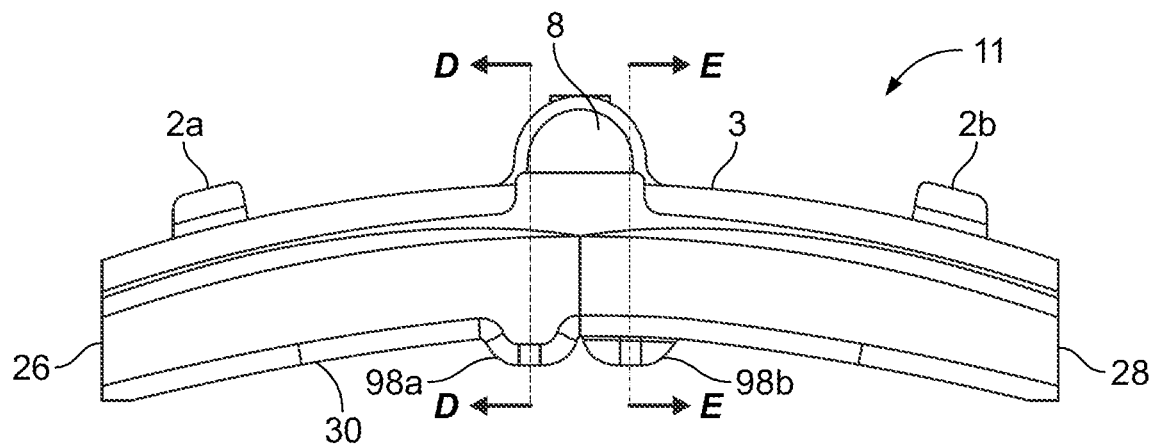
FIG. 18 is a side view of the friction device shown in FIG. 17.
Figure 19A:
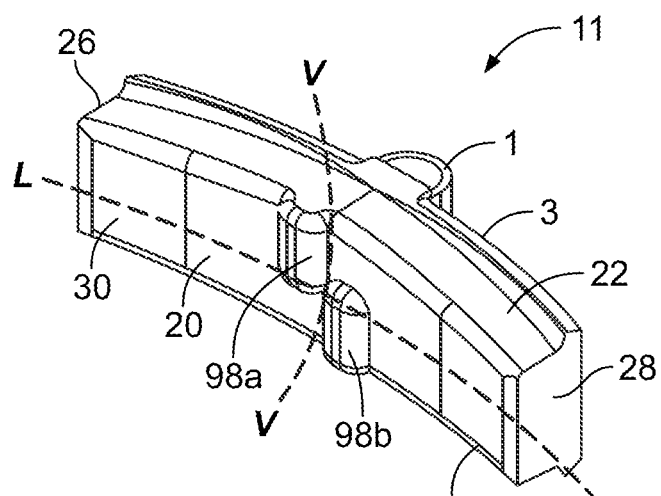
FIG. 19A is a perspective view of the friction device shown in FIG. 17.
Figure 19B:
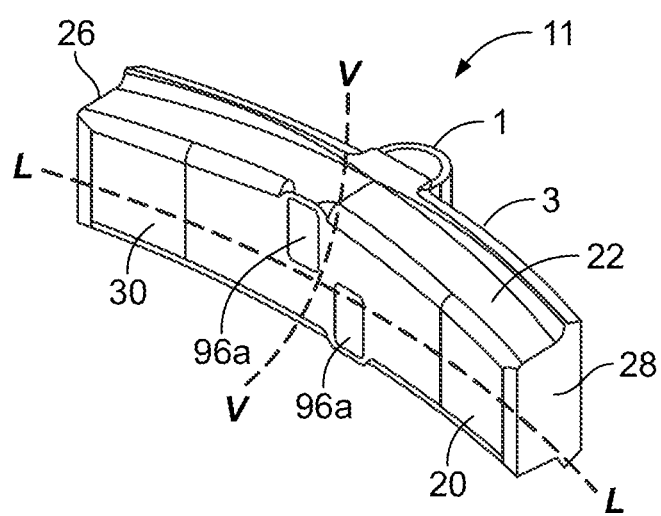
FIG. 19B is another perspective view of the friction device shown in FIG. 17.

As shown in FIGS. 15A through 16B, the grooves and protrusions may be used in combination with each other. In FIGS. 15A and 15B, the grooves extend along the lateral ends and the columns extend from the longitudinal ends. In FIGS. 16A and 16B, the grooves extend along the lateral ends and the fins extend from the longitudinal ends. Different organizational styles of the protrusions and grooves may be used. For example, columns may extend from portions of the lateral ends not occupied by the grooves, and a combination of columns and fins may extend from the longitudinal ends. The grooves may extend along each end, and the fins may extend from portions of the ends unoccupied by the grooves. The organization of grooves and protrusions need not be symmetrical about the wheel conditioning insert. For example, grooves may extend along the first lateral end but not the second end. Columns may extend from the first longitudinal end but not the second longitudinal end. Another arrangement of protrusions and grooves may be utilized across any end of the wheel conditioning insert.

Referring again to FIGS. 7A and 7B, the protrusions may be located at a point along the wheel conditioning insert that is a distance D away from the backing plate of the friction device. This prevents the protrusions from interfering with the bonding of the backing plate to the composition friction material and ensures that the protrusions fully provide the improved mechanical bonding features between the composition friction material and the wheel conditioning insert. While wheel conditioning inserts 50 have been shown with either column or fin protrusions, both may be used on an insert as well as other shapes to improve the bonding characteristics between the wheel conditioning insert and the composition friction material. The distance D may be longer than the distance between the grooves or between the protrusions.

Figure 20:
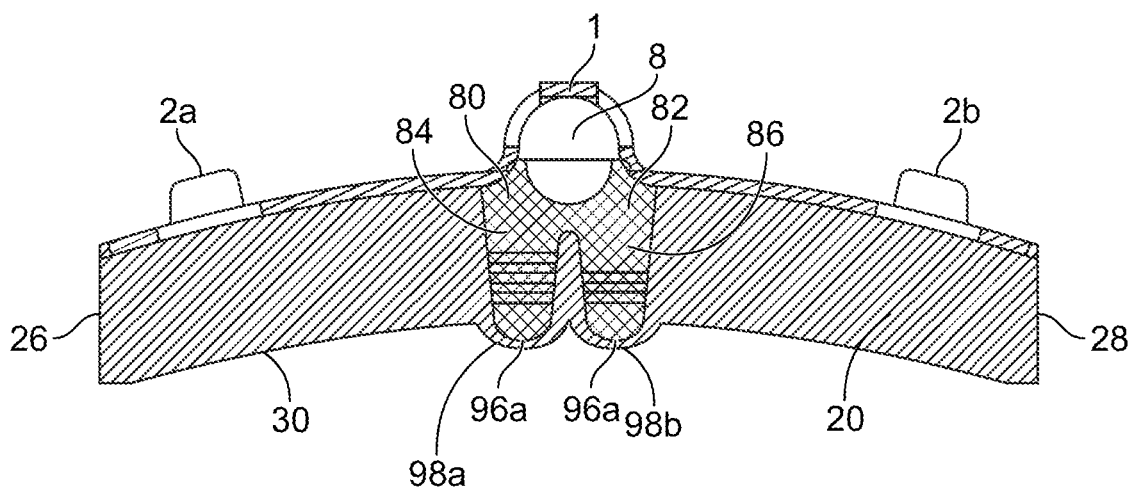
FIG. 20 is a cross-sectional view of the friction device shown in FIG. 17 along line C-C in FIG. 17.

Referring now to FIGS. 17 through 27B, a second embodiment of a wheel conditioning insert 80 with improved mechanical bonding features will now be described. FIGS. 17 through 21B show a friction device 11 with the wheel conditioning insert disposed therein. The friction device has the same features as the friction device described above, but the addition of the wheel conditioning insert creates extended portions 98a, 98a within the composition friction material. The extended portions can be larger protrusions (e.g., larger than the columns), such as bumps, undulations, or the like, that extend beyond the arcuate shaped brake surface of the friction device and being encapsulated by the composition friction material. As shown in FIGS. 19A and 20, the tread conditioning surfaces 96a, 96b extend beyond the arcuate shape of the brake surface forming the extended portions of the composition friction material and brake surface. However, the wheel conditioning surfaces may be worn down before or during use of the friction device so as to be flush with the brake surface, as shown in FIGS. 19B, 21A, and 21B.

Figure 22:
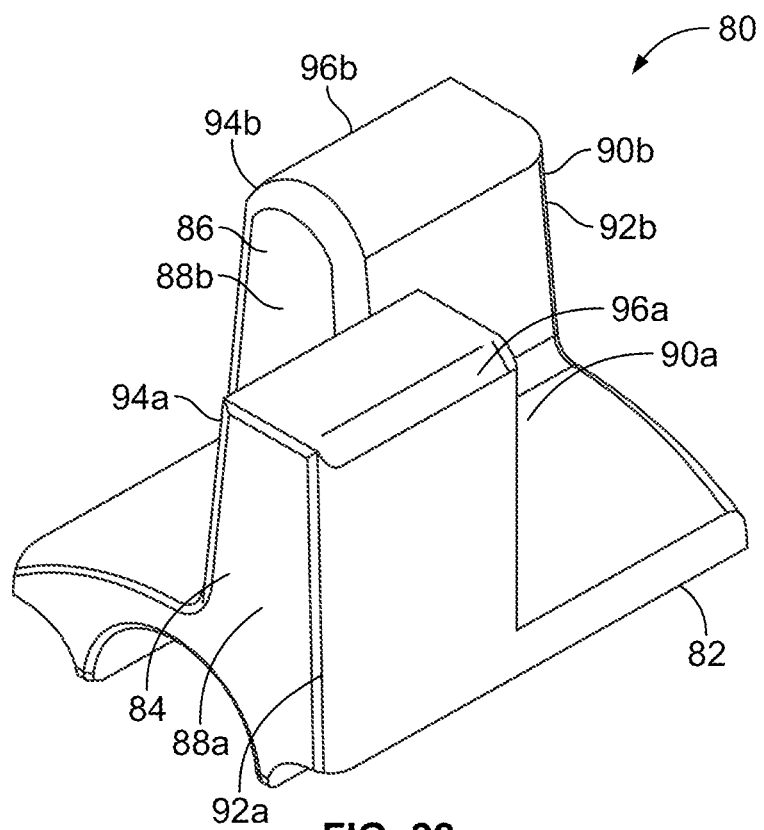
FIG. 22 is a perspective view of another example of a wheel conditioning insert.

The wheel conditioning insert disposed within the friction device is shown in FIG. 22. The wheel conditioning insert may have a base portion 82. The base portion may be located within the composition friction material and near the backing plate. Two insert bodies 84, 86 extend from the base portion toward the brake surface. Each insert body has a first lateral end or side 88a, 88b, a second lateral end or side 90a, 90b, a first longitudinal end or side 92a, 92b, a second longitudinal end or side 94a, 94b, and the wheel conditioning surface 96a, 96b. A longitudinal axis L, shown in FIGS. 19A and 19B, extends along the brake surface and substantially bisects the base portion of the wheel conditioning insert. Optionally, the longitudinal axis may represent a circumferential direction that encircles the surface of the wheel that may be contacted by the friction material of the friction device to slow or stop movement of the wheel.

The insert bodies are laterally offset from the longitudinal axis L in opposite directions. Specifically, the first insert body may be offset from the longitudinal axis L so that it may be adjacent to the flange side of the composition friction material, and the second insert body may be offset from the longitudinal axis L so that it may be adjacent to the rim side. A lateral axis V, shown in FIGS. 19A and 19B, extends across the brake surface and substantially bisects the base portion between the opposite ends. The insert bodies may be longitudinally offset from the lateral axis V in opposite directions. Specifically, the first insert body 84 may be offset from the lateral axis V so that it may be closer to the first opposite end 26, and the second insert body 86 may be offset from the lateral axis V so that it may be closer to the second opposite end 28.

By having the insert bodies offset from both the longitudinal axis L and the lateral axis V, the friction device experiences improved manufacturing characteristics when molding the composition friction material around the wheel conditioning insert. Specifically, the longitudinally and laterally offset insert bodies permit the composition friction material to flow around the wheel conditioning insert and between the insert bodies during molding. This permits the composition friction material to be equally distributed around the wheel conditioning insert and between the insert bodies in a uniform molding process. The equal distribution of composition friction material and the uniform molding process helps to make the composition friction material more resistant to cracking around the wheel conditioning insert.

This configuration allows for the wheel conditioning surfaces to condition a majority of the wheel surface when the friction device may be applied to the wheel. The configuration allows the composition friction material to fill the space between the offset insert bodies. This composition friction material generally takes the shape of a cross between the insert bodies. Because the composition friction material takes up this space, additional mechanical bonding benefits manifest between the composition friction material and the insert bodies. This results in a greater shear strength and reduction in cracking within the composition friction material in the areas surrounding the wheel conditioning insert, especially in the areas around the insert bodies.

Figure 21A:
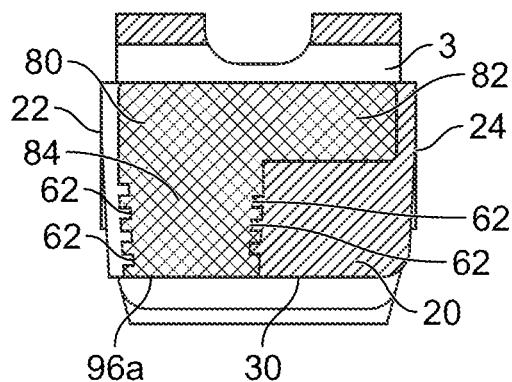
FIG. 21A is a cross-sectional view of the friction device shown in FIG. 17 along line D-D shown in FIG. 18.
Figure 21B:
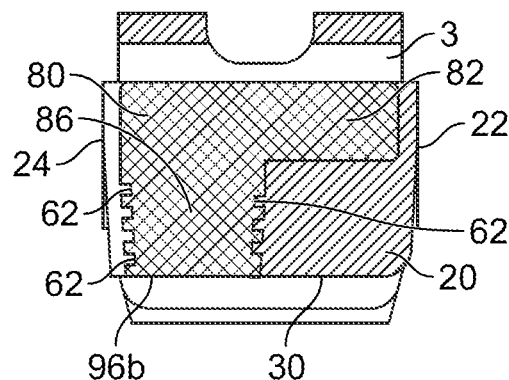
FIG. 21B is a cross-sectional view of the friction device shown in FIG. 17 along line E-E shown in FIG. 18.
Figure 23B:
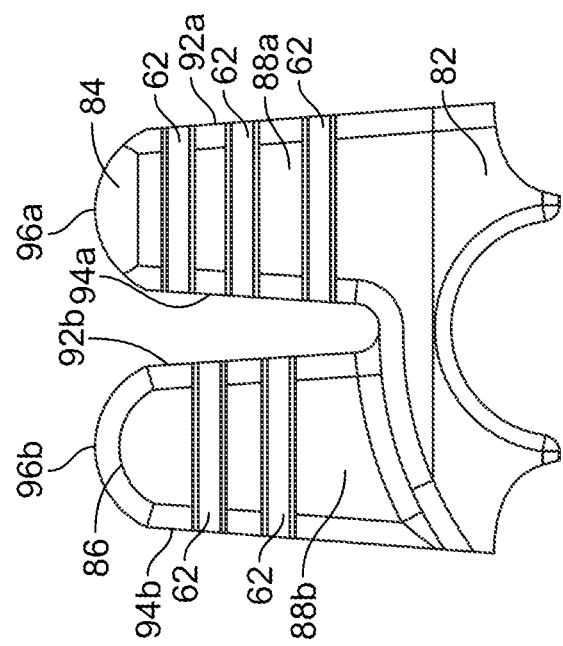
FIG. 23B is an end view of the wheel conditioning insert shown in FIG. 23A.
Figure 23A:
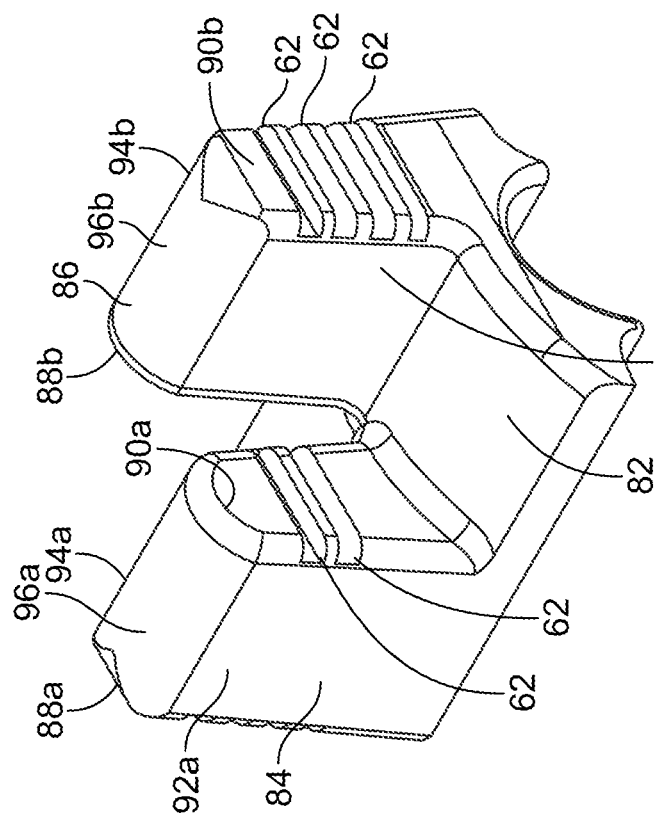
FIG. 23A is a perspective view of another example of a wheel conditioning insert.

Like the wheel conditioning insert described above, the insert bodies may include grooves and protrusions 64, 70 extending around their respective ends 88a, 88b, 90a, 90b, 92a, 92b, 94a, 94b. Referring now to FIGS. 23A and 23B, the wheel conditioning insert may have grooves extend along the lateral ends of both insert bodies. The grooves accept the composition friction material therein and improve the bonding characteristics between the composition friction material and the wheel conditioning insert along the lateral ends. This is shown in FIGS. 21A and 21B where the composition friction material extends into the insert bodies along their lateral ends in the space provided by the grooves.

The grooves may extend along the longitudinal ends of the insert bodies as well. This further improves the mechanical bonding characteristics of the wheel conditioning insert along the longitudinal ends. The grooves may extend along every end 88a, 88b, 90a, 90b, 92a, 92b, 94a, 94b of the insert bodies, or the grooves may only extend along some of the ends. The organization of the grooves along the ends need not be symmetrical about the insert bodies. For example, the grooves may extend along the first lateral end 88a of the first insert body and the first longitudinal end 92b of the second insert body, but the grooves may not extend along the first lateral end 88*b* of the second insert body or the first longitudinal end 92*a* of the first insert body. The grooves may extend in a direction perpendicular to or angled to the direction shown in FIGS. 23A and 23B. The grooves may take any shape or size that may facilitate the acceptance of the composition friction material therein. Any number of grooves may be present about the insert bodies as well. In various embodiments, the grooves may take shapes different from one another, and need not be organized consistently about the ends. For example, the grooves may be organized into columns, as shown in FIGS. 23A and 23B, or the grooves may be staggered across the ends of the insert bodies.

As shown in FIGS. 24A and 24B, the column protrusions may extend from the longitudinal ends 92*a*, 92*b*, 94*a*, 94*b*. Like the columns shown in FIGS. 11 and 12, the columns shown in FIGS. 24A and 24B may include a base portion 66 extending directly from the longitudinal ends 92*a*, 92*b*, 94*a*, 94*b*, a shaft portion 68 extending from the base portion 66, and a head portion 69 extending from the shaft portion 68. The length of the columns may be short relative to the length and/or width of the wheel conditioning insert and the insert bodies. The extension of the columns into the composition friction material may serve to increase the pull-off or shear strength required to separate the composition friction material from the wheel conditioning insert or vice versa. The increased pull-off or shear strength may lessen the likelyhood of destabilization of the bonding between the composition friction material and the wheel conditioning insert disposed therein.

While the columns are only shown on the longitudinal ends, the columns may extend from the lateral ends of the insert bodies as well. The columns may be organized in any manner about the ends of the insert bodies that will create the increased pull-off or shear strength required to separate the composition friction material from the wheel conditioning insert. For example, the columns may be organized into rows or columns, or the columns may be scattered about the ends with minimal or reduced organization. Other organizational style of the columns along the ends of the insert bodies may be used.

Figure 25B:
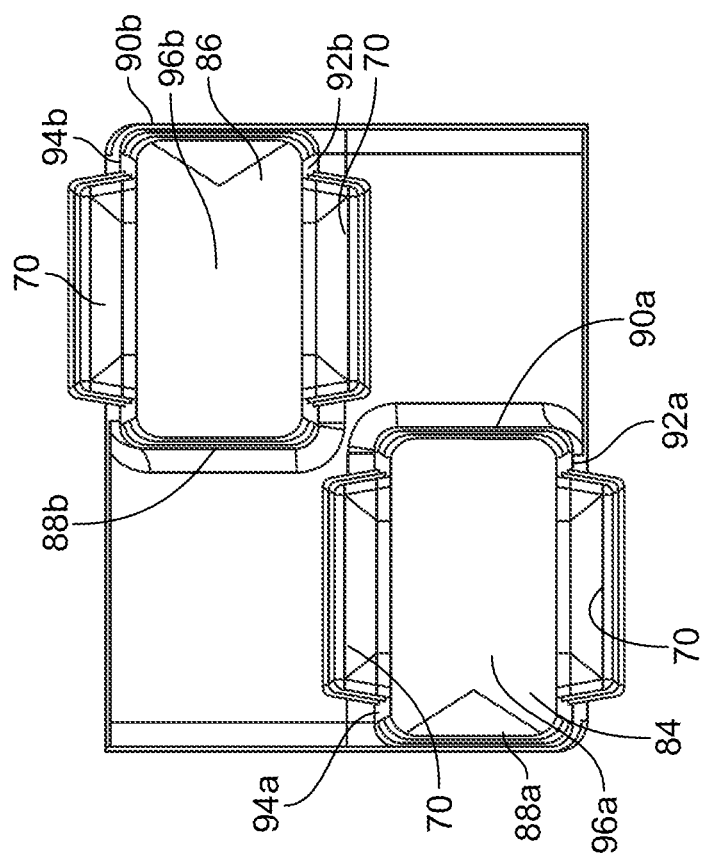
FIG. 25B is a bottom view of the wheel conditioning insert shown in FIG. 25A.
Figure 25A:
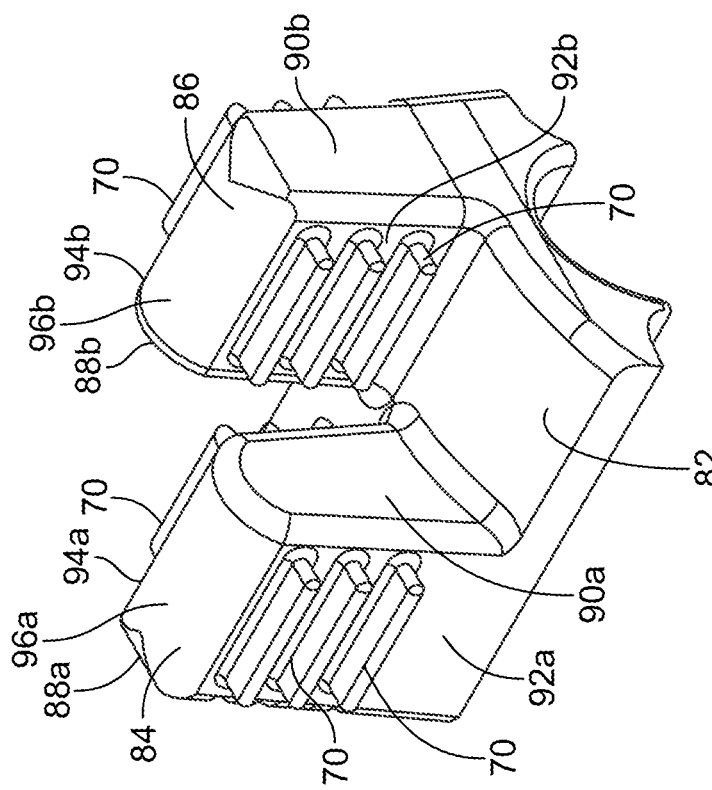
FIG. 25A is a perspective view of another example of a wheel conditioning insert.

As shown in FIGS. 25A and 25B, the protrusions may take the form of elongated fins 70. The fins may extend into the composition friction material from the longitudinal ends to improve the bonding characteristics between the composition friction material and the wheel conditioning insert as described above in connection with the columns. While the fins are only shown extending from the longitudinal ends, the fins may extend from the lateral ends of the insert bodies as well.

The fins may be organized along the ends of the insert bodies in another style that helps to facilitate the improved mechanical bonding features between the composition friction material and the wheel conditioning insert described herein. For example, the fins may be organized in columns, as shown in FIGS. 25A and 25B, or the fins may be staggered. The fins may have different lengths along the ends of the insert bodies, or the lengths of the fins may be uniform. The fins may extend in a direction perpendicular or angled to the direction shown in FIGS. 25A and 25B. Another organizational style of the fins along the ends may be used as an alternate.

Figure 26B:
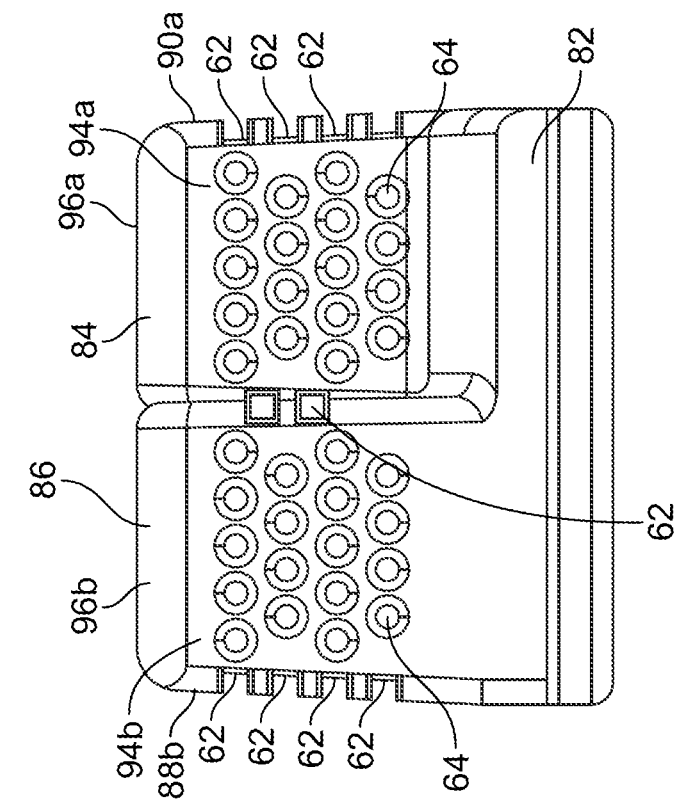
FIG. 26B is a side view of the wheel conditioning insert shown in FIG. 26A.
Figure 26A:
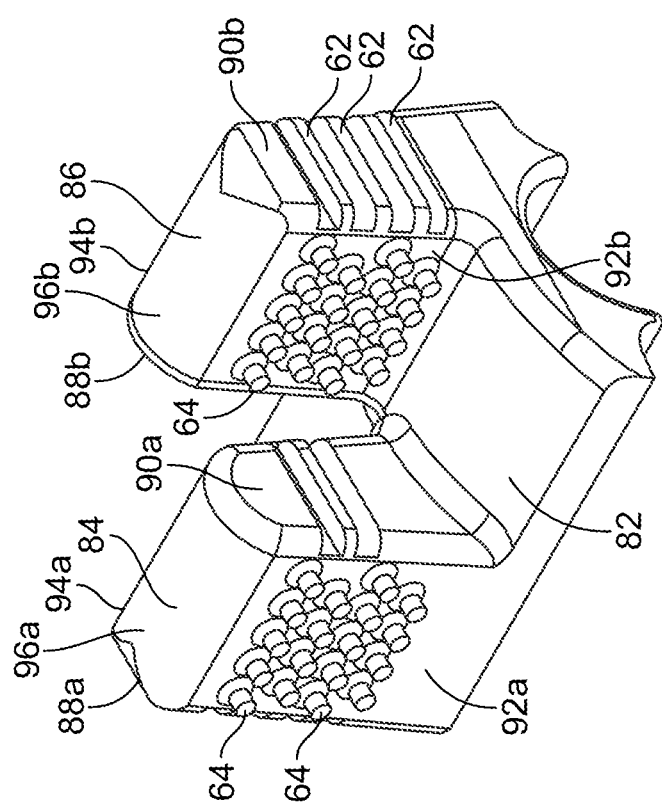
FIG. 26A is a perspective view of another example of a wheel conditioning insert.
Figure 27B:
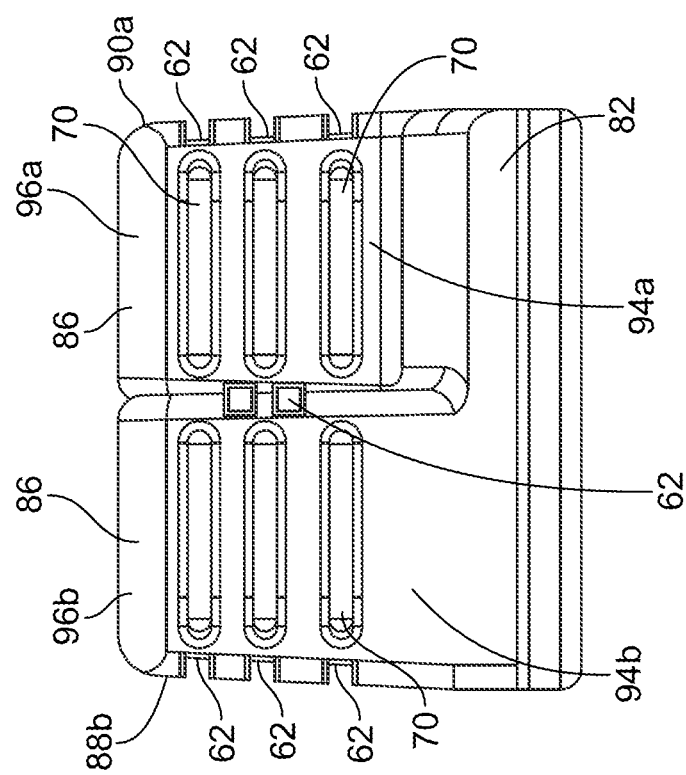
FIG. 27B illustrates another view of the wheel conditioning insert shown in FIG. 27A.
Figure 27A:
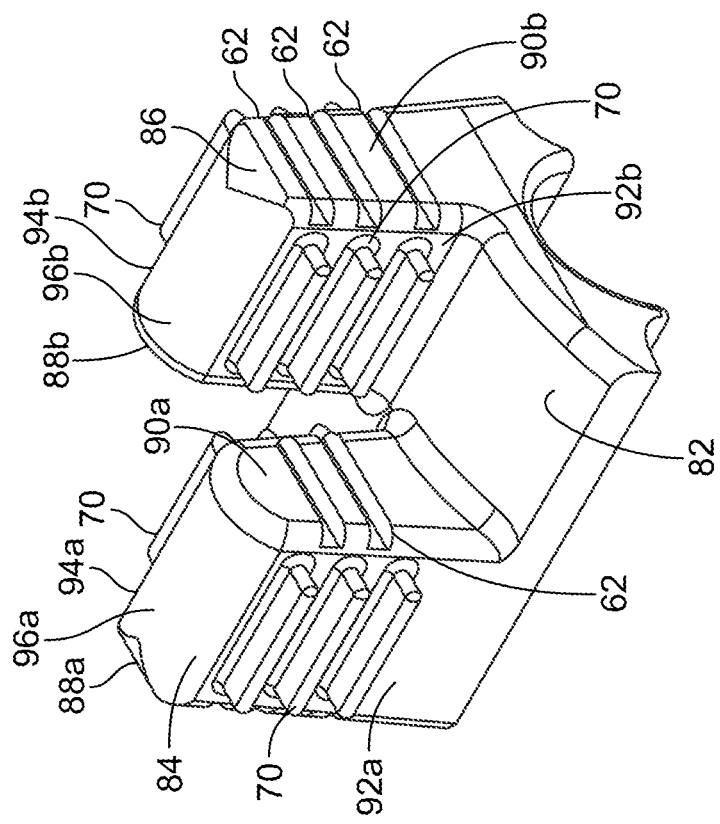
FIG. 27A illustrates another example of wheel conditioning insert.

As shown in FIGS. 26A-27B, the grooves and protrusions may be used in combination on the insert bodies. In FIGS. 26A and 26B, the grooves extend along the lateral ends of the insert bodies while the columns extend from the longitudinal ends. In FIGS. 27A and 27B, the grooves extend along the lateral ends while the fins extend from the longitudinal ends. Different organizational styles of the grooves and protrusions may be used. For example, columns may extend from the portions along the lateral ends unoccupied by the grooves. Combinations of columns and fins may extend from the lateral ends. The grooves may extend along each end with fins extending from portions of the ends unoccupied by the grooves. The organization of the grooves and protrusions need not be symmetrical with respect to the insert bodies. For example, grooves may extend along the first longitudinal end of the second insert body while fins may extend from the first longitudinal end of the first insert body. Optionally, another arrangement of the grooves and protrusions on the ends may be used.

Figure 28:
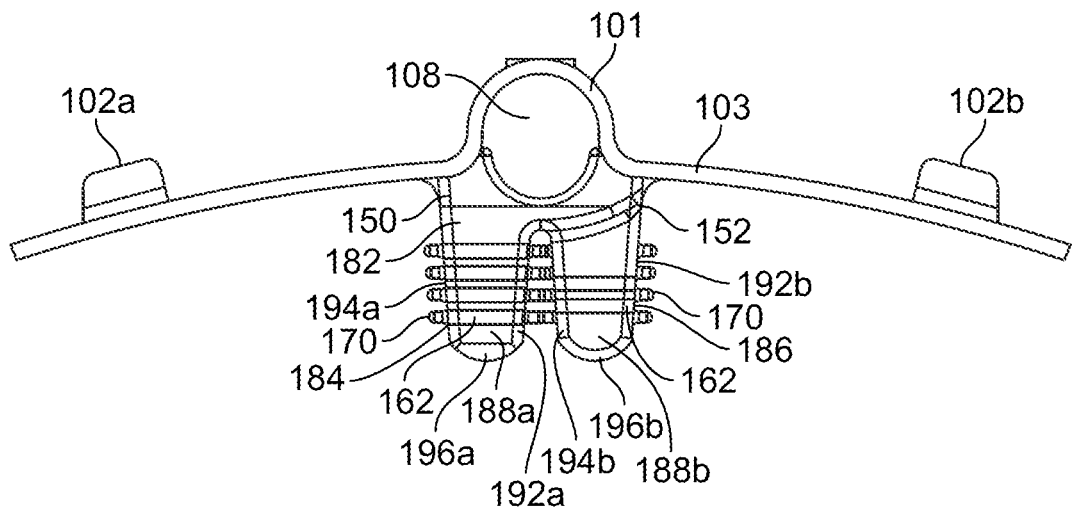
FIG. 28 is a side view of another example of an integral backing plate and wheel conditioning insert.
Figure 29:
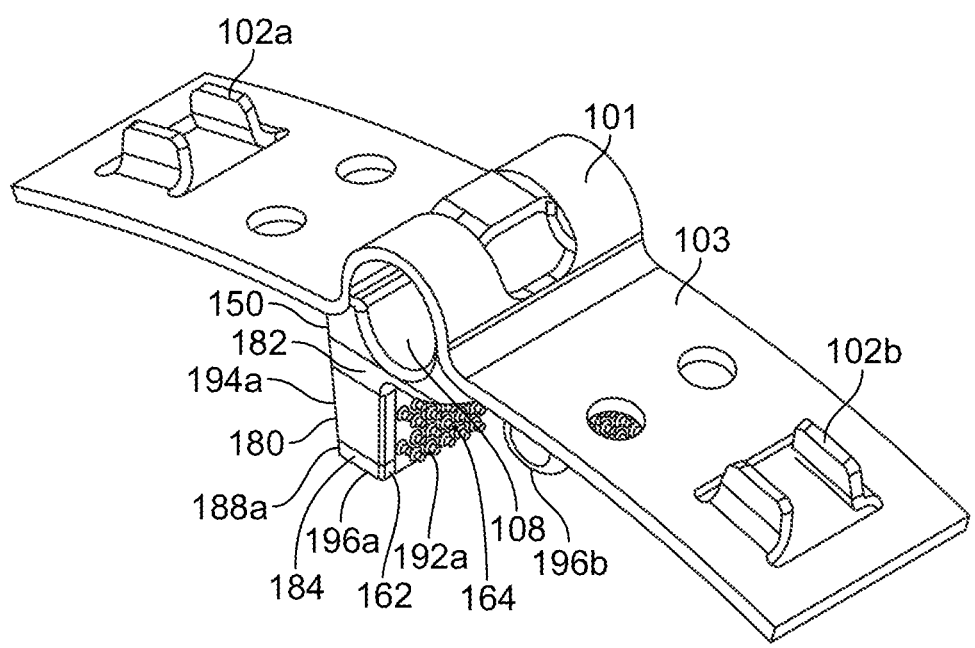
FIG. 29 is a perspective view of another example of an integral backing plate and wheel conditioning insert.

Referring now to FIGS. 28 and 29, another embodiment of a wheel conditioning insert 180 is shown. The wheel conditioning insert may be integral with and extends from a backing plate 103. Like the backing plate described above, the backing plate may be made of metallic material such as iron or steel, but other reinforced composite materials may be used. The wheel conditioning insert has linking portions 150, 152 to connect the wheel conditioning insert to the backing plate. The backing plate, linking portions, and the wheel conditioning insert may be made of the same metallic or composite material and be formed as one piece, or the components may be made of different metallic or composite materials and be fastened together. The wheel condition insert may be disposed within composition friction material (not shown), and the backing plate may be attached to the composition friction material. When fully assembled before use, a friction device having an integral backing plate and wheel conditioning insert may look substantially similar to the friction device shown in FIGS. 17 through 19B.

The wheel conditioning inserts shown in FIGS. 28 and 29 are examples. Another wheel conditioning insert with or without the features described herein may be made integral with the backing plate as described in this embodiment. As shown, the wheel conditioning insert may have a base portion 182 with two insert bodies 184, 186 extending therefrom. Each insert body has two longitudinal ends 188*a*, 188*b*, 190*a*, 190*b* and two lateral ends 192*a*, 192*b*, 194*a*, 194*b*. Like the wheel conditioning insert described above, the insert bodies may have additional features such as grooves 162 and protrusions 164, 170 extending from respective ends 188*a*, 188*b*, 190*a*, 190*b*, 192*a*, 192*b*, 194*a*, 194*b*. As shown in FIG. 28, grooves extend along lateral ends 188*a*, 188*b* and fins extend from the longitudinal ends 192*a*, 192*b*, 194*a*, 194*b*. As shown in FIG. 29, the lateral end 188*a* of the first insert body may have grooves while the first longitudinal side 192*a* has a plurality of columns extending therefrom. As described above, any combination or organization of grooves and protrusions may be used on the ends of the insert bodies as necessary.

In another feature of the subject matter described herein, a friction device for use on a vehicle (e.g., a railway vehicle or other vehicle) may include a backing plate adapted to interface with a brake head of the vehicle, a composition friction material disposed onto the backing plate to form a brake surface of the friction device for engaging a wheel of the vehicle including two opposite lateral ends and two opposite longitudinal ends, and at least one tread conditioning insert disposed within the composition friction material including a wheel conditioning surface, a first opposite longitudinal side, a second opposite longitudinal side, a first opposite lateral side, and a second opposite lateral side. At least one convolution may be formed on at least one of the first opposite longitudinal side, the second opposite longitudinal side, the first opposite lateral side, or the second opposite lateral side such that a contact surface between the tread conditioning insert and the wheel changes as the tread conditioning insert wears away with contact with the wheel, thereby regenerating a surface of the wheel.

The tread conditioning insert may be formed of a material different than the composition friction material, and may be metallic. At least one convolution may be formed on each of the first and second opposite lateral sides. The convolution may include at least one convex portion and at least one concave portion. The first and second opposite lateral sides of the tread conditioning insert may include at least one convolution, where each convolution may include at least one convex and concave portion. The convolutions of the first and second opposite lateral sides may include a plurality of alternating convex portions and concave portions.

The convolution may include a plurality of alternating convex portions and concave portions. The concave portions may have a larger width dimension than the width dimension of the convex portions. The friction device may comprise a key bridge connected to the backing plate and adapted to secure the friction device to a brake head of a railway vehicle. The tread conditioning insert may be connected to the key bridge. The key bridge may be formed integrally with the backing plate. The backing plate may comprise at least one opening and the key bridge may comprise at least one prong may engage the opening to secure the key bridge to the backing plate.

The brake surface may include a first portion with a first radius of curvature and a second portion with a second radius of curvature different from the first radius of curvature. The backing plate may be arcuate-shaped and comprises a convex side and a concave side. The wheel conditioning surface may be arcuate-shaped.

A method of forming a friction device for use on a vehicle may include providing a backing plate adapted to interface with a brake head of the vehicle, and disposing a composition friction material onto the backing plate to form a brake surface for engaging a wheel of the railway vehicle. The composition friction material can include two opposite lateral ends and two opposite longitudinal ends. The method can include providing at least one tread conditioning insert within the composition friction material. The tread conditioning insert can include a wheel conditioning surface, a first opposite lateral side, a second opposite lateral side, a first opposite longitudinal side, and a second opposite longitudinal side. The convolution can be formed on at least one of the first opposite lateral side, the second opposite lateral side, the first opposite longitudinal side, or the second opposite longitudinal side, such that a contact surface between the tread conditioning insert and the wheel changes as the tread conditioning insert wears away with contact with the wheel (thereby regenerating a surface of the wheel).

The method can include forming the brake surface to comprise a first portion with a first radius of curvature and a second portion with a second radius of curvature different from the first radius of curvature. The method may include forming the convolution on the first opposite lateral side and the second opposite lateral side. The convolution may include at least one convex portion and at least one concave portion. The method may include forming the at least one convolution on the first opposite lateral side and the second opposite lateral side, where a plurality of alternating concave portions and one convex portion are formed on the first opposite lateral side and the second opposite lateral side.

A friction device for use on a vehicle can include a backing plate adapted to interface with a brake head of the vehicle, and a composition friction material disposed onto the backing plate to form a brake surface of the friction device for engaging a wheel of the vehicle. The composition friction material may have two opposite lateral ends and two opposite longitudinal ends. The friction device can include at least one tread conditioning insert disposed within the composition friction material and including a wheel conditioning surface, a first opposite lateral side, a second opposite lateral side, a first opposite longitudinal side, and a second opposite longitudinal side. At least one convolution may be formed on at least one of the first opposite lateral side, the second opposite lateral side, the first opposite longitudinal side, or the second opposite longitudinal side, such that a contact surface between the tread conditioning insert and the wheel changes as the tread conditioning insert wears away with contact with the wheel, thereby regenerating a surface of the wheel.

The tread conditioning insert can be formed of a material different than the composition friction material. For example, the tread conditioning insert can be metallic. At least one convolution can be formed on each of the first and second opposite lateral sides. The convolution can include at least one convex portion. The convolution can be formed on the first opposite lateral side and the second opposite lateral side and include a plurality of alternating convex portions and concave portions.

The convolutions can include a plurality of alternating convex portions and concave portions. The concave portions can have a larger width dimension than the width of the convex portions.

A suitable friction device can include a key bridge connected to the backing plate and adapted to secure the friction device to a brake head of the vehicle. The conditioning insert can be connected to the key bridge. In one embodiment, the key bridge may be formed integrally with the backing plate. The backing plate can include at least one opening and the key bridge can include at least one prong engaging the opening to secure the key bridge to the backing plate. The brake surface can include a first portion with a first radius of curvature and a second portion with a second radius of curvature different from the first radius of curvature. The backing plate can be arcuate-shaped and include a convex side and a concave side. The wheel conditioning surface can be arcuate-shaped.

A method of forming a friction device for use on a vehicle may include providing a backing plate adapted to interface with a brake head of the vehicle and disposing a composition friction material onto the backing plate to form a brake surface for engaging a wheel of the vehicle. The composition friction material may have opposite lateral ends and opposite longitudinal ends. The method may include providing at least one tread conditioning insert within the composition friction material. The tread conditioning insert may include a wheel conditioning surface, a first opposite lateral side, a second opposite lateral side, a first opposite longitudinal side, and a second opposite longitudinal side. At least one convolution may be formed on at least one of the first opposite lateral side, the second opposite lateral side, the first opposite longitudinal side, or the second opposite longitudinal side such that a contact surface between the tread conditioning insert and the wheel changes as the tread conditioning insert wears away with contact with the wheel, thereby regenerating a surface of the wheel.

The method can include forming the brake surface to include a first portion with a first radius of curvature and a second portion with a second radius of curvature different from the first radius of curvature. The method can include forming the convolution(s) on the first opposite lateral side and the second opposite lateral side. The convolution(s) can include at least one convex portion and at least one concave portion. The method optionally can include forming the convolution(s) on the first opposite lateral side and the second opposite lateral side, where a plurality of alternating concave portions and one convex portion are formed on the first opposite lateral side and the second opposite lateral side.

Unlike other friction devices, the inventive subject matter described herein results in a contact surface between the insert and a wheel tread that varies as the friction device wears. This permits regeneration of the surface of the wheel to occur at a pace that may be beneficial to both the wheel and the friction device. Furthermore, this results in improved bonding between the bonded insert and the friction material that makes up the friction device. Improved bonding results in a beneficial increase in the shear or pull-off strength required to separate or loosen the bonded insert from the friction material.

Figure 31:
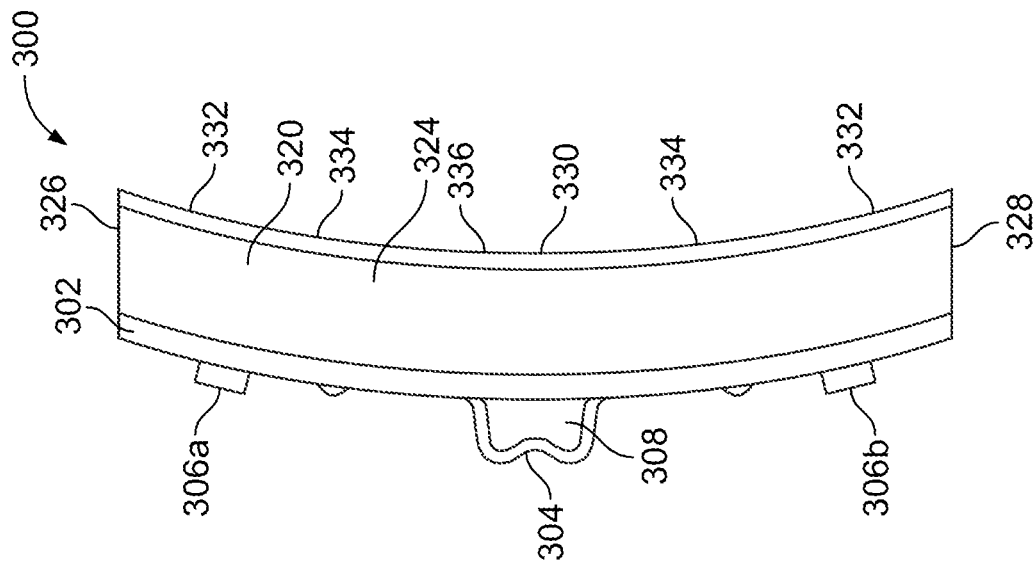
FIG. 31 is a side view of the friction device shown in FIG. 30.
Figure 30:
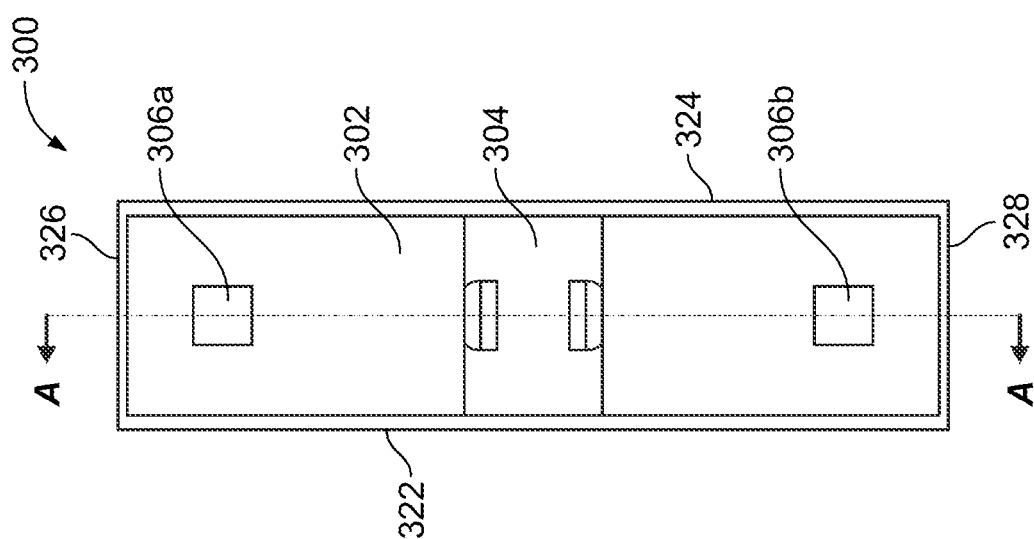
FIG. 30 is a top view of a friction device with a bonded insert according to one embodiment.

As shown in FIGS. 30 and 31, a friction device 300 in accordance with one embodiment is illustrated. The friction device may include a backing plate 302 that may be made of metallic material such as steel. However, the backing plate may be made of reinforced composite materials that are suitable for use with railway vehicles. The backing plate may be arcuate in shape. This may permit the friction device to properly interact against a vehicle wheel tread. The backing plate may include a pair of rejection lugs 306a, 306b. The rejection lugs may be integrally formed with the backing plate, and may extend from a top surface thereof. The rejection lugs are sized and positioned in such a way so as to mate with corresponding rejection lug receptacles (not shown) on a corresponding brake head (not shown). The rejection lugs may be compatible with a variety of brake heads or may only correspond with a certain type of brake head, or may engage only in one orientation, to prevent the installation of the friction device on an improper brake head or in an improper manner.

In one embodiment, the friction device may include a key bridge 304. The key bridge may be integrally formed with the backing plate or may be attached to the backing plate prior to installation. Like the backing plate, the key bridge may be made of a metallic material or a reinforced composite material. The key bridge may be coupled to a brake head (not shown) of a vehicle, such as a rail vehicle or another type of vehicle. An opening 308 in the key bridge may accept a locking key (not shown) which fastens the friction device to the vehicle brake head. In embodiment shown, the key bridge may be M shaped. In other embodiments, the key bridge may be circular, triangular, or take any other shape necessary to facilitate fastening of the key bridge to the brake head.

In one embodiment, the composition friction material may be affixed to and extends from the backing plate along the surface opposite the rejection lugs and key bridge. To be affixed to the backing plate, the composition friction material may include an adhesion layer. The adhesion layer may facilitate proper fixture to the backing plate, secure the composition friction material to the backing plate, allow some flex or compliance to maintain adhesion during use, and the like. The composition friction material may be affixed to the backing plate by another technique. The composition friction material may have two opposite lateral ends or sides 322, 324 and two opposite longitudinal ends or sides 326, 328. The lateral ends extend along the length of the friction device, and the longitudinal ends extend between the lateral ends. The composition friction material forms a brake surface of the friction device. The brake surface contacts the vehicle wheel tread to apply a braking force to the vehicle. The composition friction material may be a composite material that provides the required friction and braking effort when forced against the tread of the wheel. A suitable composite material may be a material that can provide the proper braking force to the wheel tread. Although a composite material may be used in one embodiment, the material providing the braking force need not be composite in other embodiments. Rather, it may be a metal or metal alloy that can apply the proper braking force to the wheel.

Figure 32:
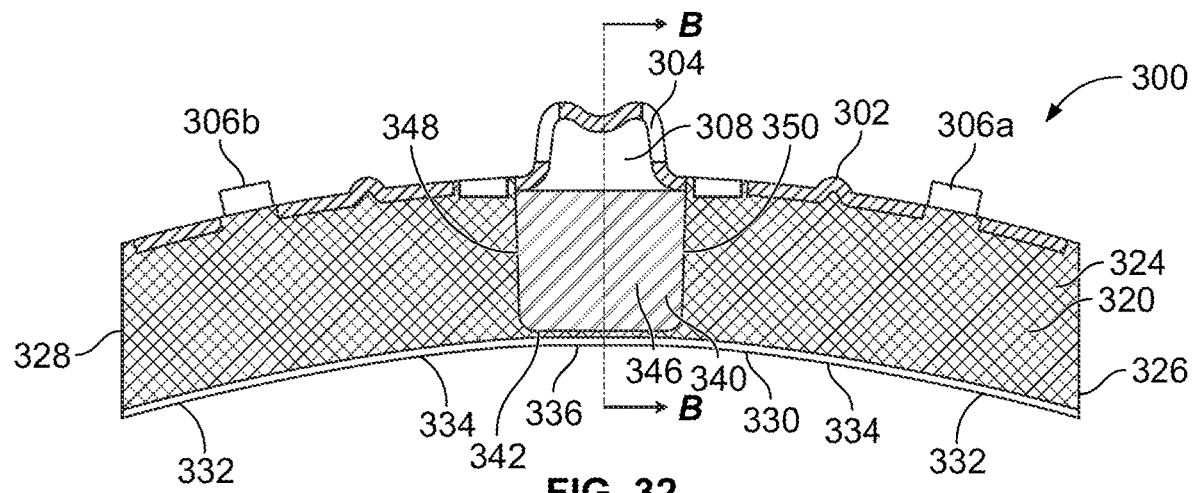
FIG. 32 is a cross-sectional view of the friction device shown in FIG. 30 along line A-A in FIG. 30.

The composition friction material generally takes the arcuate shape of the backing plate so as to properly interact against a vehicle wheel tread. The brake surface may take the arcuate shape of the backing plate. As shown in FIGS. 31 and 32, the brake surface, while still adhering to the arcuate shape of the backing plate, may have different radiis radii of curvature. First outside portions 332 of the brake surface may have a first radii of curvature and second inner portions 334 may have a second radii of curvature. A central portion 336 of the brake surface may have a third radii of curvature. The radius of curvature of the central portion may generally correspond to a wheel engaging surface 342 of a tread conditioning insert 340.

Referring now to FIGS. 32 through 37, a tread conditioning insert 340 may be disposed in the composite friction material. The tread conditioning insert may have a wheel engaging surface 342, two opposite lateral sides 344, 346 and two opposite longitudinal sides 348, 350. The wheel engaging surface may be for conditioning the railway vehicle wheel tread. The tread conditioning insert may be bonded to and adheres to the composite friction material, so that the insert may be surrounded by the composite friction material within the friction device. The Figures show an embodiment in which a tread conditioning insert is fully surrounded by the composite friction material. In another embodiment, a wheel engaging surface 342 may be exposed to and flush with the brake surface. In either instance, the wheel engaging surface of the tread conditioning insert may be arcuate in shape so to permit conditioning of the vehicle wheel tread. In instances where the composite friction material fully surrounds and encapsulates the tread conditioning insert, the repeated braking of the vehicle will wear away the composite friction material eventually exposing the wheel engaging surface of the tread conditioning insert. While only a single tread conditioning insert 340, multiple tread conditioning inserts may be disposed along the friction device.

The tread conditioning insert may be formed by a hardened material such as cast iron, another metal or metal alloy, or a sintered material. The tread conditioning insert can be formed of another material with suitable abrasive properties for the tread conditioning insert's application. As the friction device is applied to the surface of a wheel tread, the tread conditioning insert rubs against the wheel surface. The abrasive properties of the insert conditions the wheel surface to prevent, reduce, or remove defects. The abrasive properties may lead to better friction performance in extreme conditions. There may be some manufacturing defects in the wheel, or the wheel may form defects on the wheel surface during operation of the vehicle. By including the tread conditioning insert within the composition material, the friction device combines the braking of the composite friction material with the wheel conditioning advantages of the tread conditioning insert. Along with the conditioning, the tread conditioning insert may serve to provide a braking force that may be helpful in adverse weather conditions.

The tread condition insert may serve to conduct heat away from the wheel tread during operation, which helps prevent overheating of the wheel. However, when the tread conditioning insert may be fully encapsulated by the composite friction material, the composite friction material serves to insulate the insert, thereby restricting heat transfer away from the wheel tread.

Figure 33:
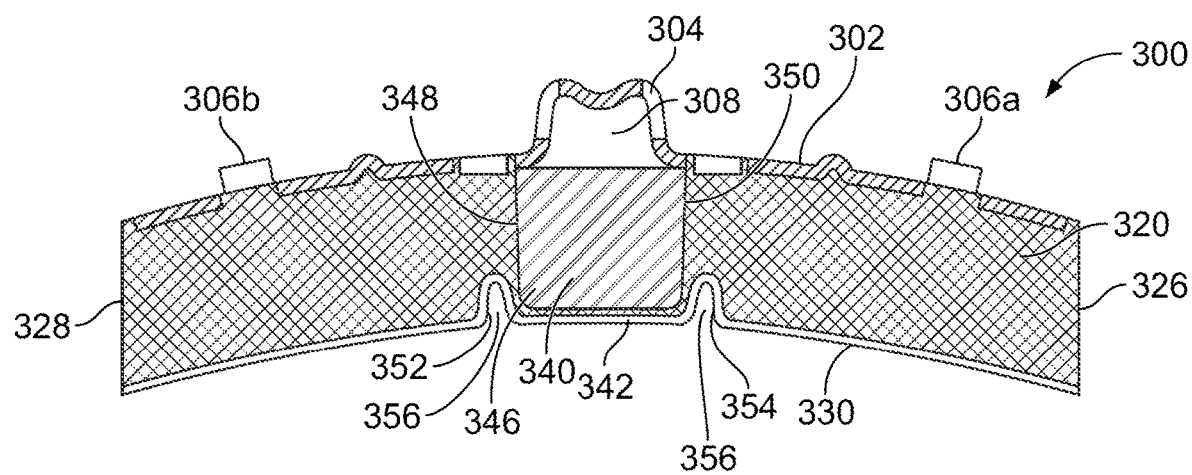
FIG. 33 is a cross-sectional view of the friction device shown in FIG. 30 along line A-A in FIG. 30.

Referring now to FIG. 33, optional grooves may be provided in the composite friction material adjacent to the two longitudinal sides of the tread conditioning insert. The grooves may extend partially across the opposite longitudinal sides or fully across the longitudinal sides. As shown in FIG. 33, the grooves may extend partially into the composite friction material. Suitable grooves may extend from the brake surface all the way to the backing plate. The grooves may provide an air gap 356 between the tread conditioning insert and the composite friction material. This air gap permits heat to be transferred from the wheel tread to the tread conditioning insert and then to the ambient air. This may allow the friction device to dissipate heat from the wheel tread during use.

Figure 34:
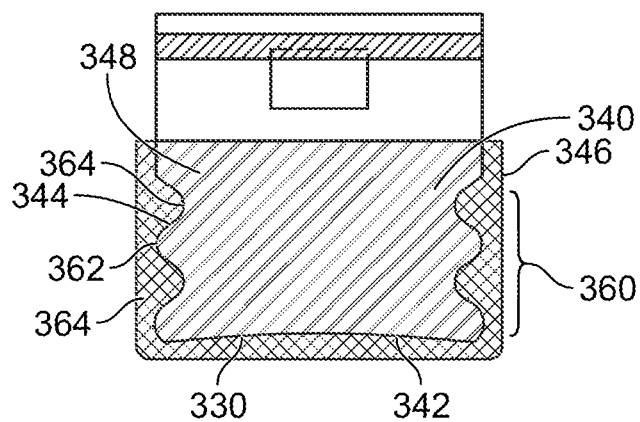
FIG. 34 is a cross-sectional view of the friction device shown in FIG. 32 along line B-B in FIG. 32.
Figure 35:
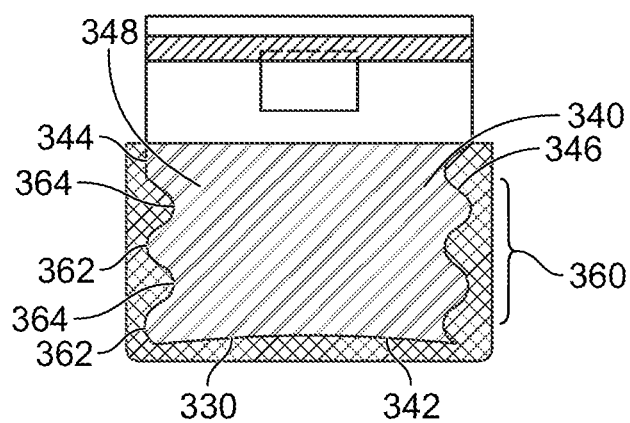
FIG. 35 is a cross-sectional view of the friction device shown in FIG. 31 along line B-B in FIG. 32.
Figure 36:
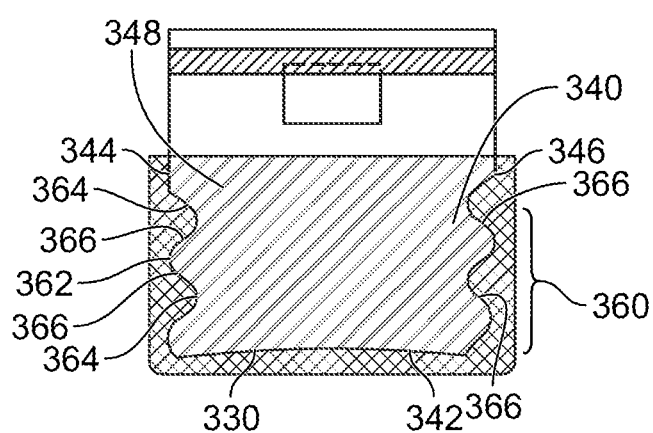
FIG. 36 is a cross-sectional view of the friction device shown in FIG. 31 along line B-B in FIG. 32.

Referring now to FIGS. 34 through 36, the tread conditioning insert may take various shapes that are advantageous to both the conditioning of the wheel tread and the bonding of the tread conditioning insert to the composite friction material. The shapes may increase the pull-off strength required to separate or loosen the tread conditioning insert from the composition friction material, therefore improving the bonding between the tread conditioning insert and the composition friction material. The tread conditioning insert may include wave-like convolutions or undulations 360. The undulating surfaces can be along the opposite sides 344, 346. The undulating surfaces provide the tread conditioning insert with various shapes to provide the aforementioned advantageous conditioning of the wheel tread. As shown in FIGS. 34 through 36, the undulations are located on the lateral sides of the tread condition insert. The undulations may be located on the longitudinal sides of the tread condition insert. The undulations may be located on the lateral sides and the opposite longitudinal sides simultaneously.

The undulations include convex and concave portions 362, 364. The convex portions extend outwardly of the opposite lateral sides of the tread conditioning insert as projections and the concave portions extend inwardly of the opposite lateral sides as recesses. Multiple convex and concave portions are shown, alternatively, a single convex and concave portion or a single convex and concave portion may be provided on the opposite lateral sides or the opposite longitudinal sides of the tread conditioning insert. The portions change the surface area of the wheel engaging surface of the tread conditioning insert as repeated uses of the friction device wear away the tread conditioning insert. During use, the surface area of the wheel engaging surface may decrease and increase in size across the wheel engaging surface. This changing surface area allows for regeneration of the surface of the wheel tread, but the regeneration may be less aggressive than if the tread conditioning insert had a constant surface area across the wheel engaging surface. The changing surface area prevents over conditioning on some areas of the wheel tread. The organization of the convex and concave portions and the changing surface area of the wheel engaging surface is described below.

A first configuration of the tread conditioning insert is shown in FIG. 34. This configuration aligns the convex portions on the first lateral side with the convex portions on the second opposite lateral side. The concave portions on the lateral sides align with each other. The maximum points or peaks of the convex portions on the first lateral side may align with (e.g., are equidistantly located from a common surface along directions that are perpendicular to that surface) the maximum points or peaks of the convex portions on the second opposite lateral side. The minimum points or nadirs of the concave portions on the first opposite lateral side align with the minimum points or nadirs of the concave portions on the second opposite lateral side (e.g., are equidistantly located from a common surface along directions that are perpendicular to that surface). This configuration of the convex and concave portions results in the surface area of the wheel engaging surface of the tread conditioning insert to shrink and grow across the surface of a wheel tread as use of the friction device results in the tread conditioning insert to wear away.

Referring now to FIG. 35, a second configuration of the tread conditioning insert is shown. This configuration aligns the convex portions on a first lateral side with the concave portions on the second lateral side. The concave portions on the first lateral side align with the convex portions on the second lateral side. For example, the maximum points or peaks of the convex portions on one of the lateral sides align with the minimum points or nadirs of the concave portions 64 on the other later side 44, 46. Points, peaks, or nadirs may align with each other when the aligned points, peaks, or nadirs are equidistant from a common surface along directions that are perpendicular to the common surface. This configuration of portions results in the surface area of the wheel engaging surface remaining the same although the portion of the wheel tread the wheel engaging surface conditions changes as the tread conditioning insert 40 wears away during use of the friction device.

Referring now to FIG. 36, a third configuration of the tread conditioning insert is shown. This configuration aligns the convex portions on the first lateral side with a midpoint 366 between the convex and concave portions on the second lateral side. The concave portions on the first lateral side align with the midpoints between convex and concave portions on the second lateral side. Each midpoint may be located halfway between a peak of a convex portion and a nadir of a neighboring concave portion along the undulating surface between the convex portion and the concave portion. Points, peaks, nadirs, and/or midpoints may align with each other when the aligned points, peaks, or nadirs are equidistant from a common surface along directions that are perpendicular to the common surface.

This configuration can align the convex and concave portions on the second lateral side with the midpoints between the convex and concave portions on the first lateral side. This configuration of portions can result in the surface area of the wheel engaging surface remaining the same although the portion of the wheel tread the wheel engaging surface conditions changes as the tread conditioning insert wears away during use of the friction device.

In one embodiment, a conditioning insert of a friction device may have a body having a conditioning surface that may engage a wheel, opposite first and second sides intersecting the conditioning surface, and opposite third and fourth sides intersecting the conditioning surface. Each of the first and second sides extend from the third side to the fourth side. The body may define one or more of (a) a recess extending into one or more of the first side, the second side, the third side, or the fourth side and may receive friction material of the friction device and/or (b) a protrusion extending out of the first side, the second side, the third side, or the fourth side and into the friction material of the friction device.

Optionally, the body may define the recess as an elongated groove extending across the first side from the third side to the fourth side. The elongated groove can be a first groove of a plurality of separate grooves in the body. The separate grooves can be oriented parallel to each other and to the conditioning surface. The elongated groove can extend across each of the first side, the second side, the third side, and the fourth side. The body can include the protrusion as one or more elongated columns projecting from at least one of the first side, the second side, the third side, and/or the fourth side. The body can include the protrusion as one or more fins projecting from at least one of the first side, the second side, the third side, and/or the fourth side and that are elongated in directions that are parallel to the conditioning surface.

The body can include the recess extending into less than all of the first side, the second side, the third side, and the fourth side, and the body defines the projection protruding from one or more of the first side, the second side, the third side, and/or the fourth side that does not include the recess. The body can include a base portion and one or more extended portions outwardly extending from the base portion and toward a friction surface of the friction device. The extended portions can include one or more of the recess and/or the protrusion. The body can include at least two of the extended portions that are offset from each other along a circumferential direction that encircles a surface of the wheel.

A friction device for a wheel may include friction material may engage a surface of the wheel to slow or stop movement of the wheel and a conditioning insert embedded in the friction material. The conditioning insert may have a body having a conditioning surface that may engage the surface of the wheel, opposite first and second sides intersecting the conditioning surface, and opposite third and fourth sides intersecting the conditioning surface. Each of the first and second sides extends from the third side to the fourth side. The body may have one or more of (a) a recess extending into one or more of the first side, the second side, the third side, or the fourth side and may receive friction material of the friction device and/or (b) a protrusion extending out of the first side, the second side, the third side, or the fourth side and into the friction material of the friction device. Optionally, the body may define the recess as an elongated groove extending across at least the first side from the third side to at least the fourth side. The elongated groove can extend across each of the first side, the second side, the third side, and the fourth side.

The body can include the protrusion as one or more elongated columns projecting from at least one of the first side, the second side, the third side, and/or the fourth side. The body can include the protrusion as one or more fins projecting from at least one of the first side, the second side, the third side, and/or the fourth side and that are elongated in directions that are parallel to the conditioning surface.

The body can include the recess extending into less than all of the first side, the second side, the third side, and the fourth side, and the body can include the projection protruding from one or more of the first side, the second side, the third side, and/or the fourth side that does not include the recess.

A friction device for use on a vehicle may include a backing plate adapted to interface with a brake head of the vehicle, friction material disposed on the backing plate to form a brake surface that engages a wheel of the vehicle, and at least one wheel conditioning insert disposed within the friction material. The wheel conditioning insert may include a conditioning surface that may face the wheel, opposite first and second sides intersecting the conditioning surface, and opposite third and fourth sides intersecting the conditioning surface. Each of the first and second sides extends from the third side to the fourth side. The at least one wheel conditioning insert may have one or more of (a) a recess extending into one or more of the first side, the second side, the third side, or the fourth side and may receive friction material of the friction device and/or (b) a protrusion extending out of the first side, the second side, the third side, or the fourth side and into the friction material of the friction device. Optionally, the at least one wheel conditioning insert may define the recess as an elongated groove extending across at least the first side from the third side to at least the fourth side.

The at least one wheel conditioning insert can include the protrusion as one or more elongated columns projecting from at least one of the first side, the second side, the third side, and/or the fourth side. The wheel conditioning insert can include the protrusion as one or more fins projecting from at least one of the first side, the second side, the third side, and/or the fourth side and that are elongated in directions that are parallel to the conditioning surface.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise. Spatial or directional terms, such as "left", "right", "inner", "outer", "above", "below", and the like, relate to the disclosure as shown in the drawing figures and are not to be considered as limiting as the disclosure can assume various alternative orientations. All numbers and ranges used in the specification and claims are to be understood as being modified in all instances by the term "about". By "about" meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio. As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values. As used herein, the terms "perpendicular" or "substantially perpendicular" mean a relative angle as between two objects at their real or theoretical intersection is from 85° to 95°, or from 87° to 93°, or from 88° to 92°, or from 89° to 91°, or from 89.5° to 90.5°, or from 89.75° to 90.25°, or from 89.9° to 90.1°, inclusive of the recited values.

The terms "first", "second", and the like are not intended to refer to any particular order or chronology, but refer to different conditions, properties, or elements. The term "at least" is synonymous with "greater than or equal to". The term "not greater than" is synonymous with "less than or equal to". As used herein, "at least one of" is synonymous with "one or more of". For example, the phrase "at least one of A, B, and C" means any one of A, B, or C, or any combination of any two or more of A, B, or C. For example, "at least one of A, B, and C" may include one or more of A alone; or one or more B alone; or one or more of C alone; or one or more of A and one or more of B; or one or more of A and one or more of C; or one or more of B and one or more of C; or one or more of all of A, B, and C. The terms "includes" and "may include" are synonymous with "comprises".

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A conditioning insert of a friction device, the conditioning insert comprising:
    a body having a conditioning surface configured to engage a wheel, opposite first and second sides intersecting the conditioning surface and opposite third and fourth sides intersecting the conditioning surface, each of the first and second sides extending from the third side to the fourth side, and
    the body includes a recess formed as a groove extending into and across at least the first side from the third side to the fourth side and is configured to receive friction material of the friction device.

2. The conditioning insert of claim 1, wherein the recess is formed as an elongated groove as the groove extending across the first side from the third side to the fourth side and parallel to the conditioning surface of the body.

3. The conditioning insert of claim 1, wherein the groove is a first groove of a plurality of separate grooves in the body.

4. The conditioning insert of claim 3, wherein the separate grooves are oriented parallel to each other and to the conditioning surface.

5. The conditioning insert of claim 1, wherein the groove extends across each of the first side, the second side, the third side, and the fourth side.

6. The conditioning insert of claim 1, wherein the body also includes a protrusion formed as one or more elongated columns projecting from the at least one of the first side, the second side, the third side, or the fourth side.

7. The conditioning insert of claim 1, wherein the body includes a protrusion formed as one or more fins projecting from at least one of the first side, the second side, the third side, or the fourth side and that are elongated in directions that are parallel to the conditioning surface.

8. The conditioning insert of claim 1, wherein the body includes the recess and a projection protruding from one or more of the second side, the third side, or the fourth side that does not include the recess.

9. The conditioning insert of claim 1, wherein the body includes a base portion and one or more extended portions outwardly extending from the base portion and toward a friction surface of the friction device, the extended portions including one or more of the recess or a protrusion.

10. The conditioning insert of claim 9, wherein the body includes at least two of the extended portions that are offset from each other along a circumferential direction that encircles a surface of the wheel.

11. A friction device for a wheel, the friction device comprising:
    friction material configured to engage a surface of the wheel to slow or stop movement of the wheel; and
    a conditioning insert embedded in the friction material, the conditioning insert including a body having a conditioning surface configured to engage the surface of the wheel, opposite first and second sides intersecting the conditioning surface and opposite third and fourth sides intersecting the conditioning surface, each of the first and second sides extending from the third side to the fourth side,
    wherein the body includes a recess formed as an elongated groove extending into and across at least the first side from the third side to the fourth side, the recess configured to receive the friction material of the friction device.

12. The friction device of claim 11, wherein the body includes a protrusion extending out of one or more of the first side, the second side, the third side, or the fourth side and into the friction material of the friction device.

13. The friction device of claim 11, wherein the groove extends across each of the first side, the second side, the third side, and the fourth side.

14. The friction device of claim 11, wherein the body includes one or more elongated columns projecting from at least one of the first side, the second side, the third side, or the fourth side.

15. The friction device of claim 11, wherein the body includes one or more fins projecting from at least one of the first side, the second side, the third side, or the fourth side and that are elongated in directions that are parallel to the conditioning surface.

16. The friction device of claim 11, wherein the body includes a projection protruding from one or more of the second side, the third side, or the fourth side.

17. A friction device for use on a vehicle, the friction device comprising:
    a backing plate adapted to interface with a brake head of the vehicle;
    friction material disposed on the backing plate to form a brake surface that engages a wheel of the vehicle; and
    at least one wheel conditioning insert disposed within the friction material, the at least one wheel conditioning insert including a conditioning surface configured to face the wheel, opposite first and second sides intersecting the conditioning surface and opposite third and fourth sides intersecting the conditioning surface, each of the first and second sides extending from the third side to the fourth side, wherein the at least one wheel conditioning insert includes an elongated groove extending into the first side from the third side to the fourth side and configured to receive the friction material of the friction device, the at least one wheel conditioning insert also including a protrusion extending out of one or more of the first side, the second side, the third side, or the fourth side and into the friction material of the friction device.

18. The friction device of claim 17, wherein the elongated groove extends across the first side, the second side, the third side, and the fourth side.

19. The friction device of claim 17, wherein the protrusion includes one or more elongated columns projecting from the one or more of the first side, the second side, the third side, or the fourth side.

20. The friction device of claim 17, wherein the protrusion as includes one or more fins projecting from the one or more of the first side, the second side, the third side, or the fourth side and that are elongated in directions that are parallel to the conditioning surface.

* * * * *